US011185797B2

(12) United States Patent
Takaoka et al.

(10) Patent No.: US 11,185,797 B2
(45) Date of Patent: Nov. 30, 2021

(54) AGITATION/DEFOAMING APPARATUS AND METHOD AND ROTARY MOTION TRANSMISSION DEVICE

(71) Applicant: SHASHIN KAGAKU CO., LTD., Kyoto (JP)

(72) Inventors: Fumihiko Takaoka, Kyoto (JP); Yuki Nakamura, Kyoto (JP)

(73) Assignee: SHASHIN KAGAKU CO., LTD., Kyoto (JP)

( * ) Notice: Subject to any disclaimer, the term of this patent is extended or adjusted under 35 U.S.C. 154(b) by 155 days.

(21) Appl. No.: 16/488,228

(22) PCT Filed: Feb. 20, 2018

(86) PCT No.: PCT/JP2018/005980
§ 371 (c)(1),
(2) Date: Aug. 22, 2019

(87) PCT Pub. No.: WO2018/155430
PCT Pub. Date: Aug. 30, 2018

(65) Prior Publication Data
US 2019/0381425 A1 Dec. 19, 2019

(30) Foreign Application Priority Data

Feb. 22, 2017 (JP) .............................. JP2017-030761
Oct. 13, 2017 (JP) .............................. JP2017-199256

(51) Int. Cl.
*F16H 3/44* (2006.01)
*F16H 37/06* (2006.01)
(Continued)

(52) U.S. Cl.
CPC ......... *B01D 19/0052* (2013.01); *B01D 19/02* (2013.01); *B01F 9/0001* (2013.01);
(Continued)

(58) Field of Classification Search
CPC ....... B01D 19/0052; B01D 19/02; B01F 9/22; B01F 15/00538; B01F 2015/00655;
(Continued)

(56) References Cited

U.S. PATENT DOCUMENTS 5,167,448 A * 12/1992 Herold .................. B01F 9/0001
366/213
10,722,818 B2 * 7/2020 Takaoka ................ B01F 9/0001
(Continued)

FOREIGN PATENT DOCUMENTS

JP          H0671110 A       3/1994
JP          H07289873 A      11/1995
(Continued)

OTHER PUBLICATIONS

Japanese Patent Office, Office Action Issued in Application No. 2017-030761, dated Aug. 15, 2017, 8 pages. (Submitted with Machine Translation).
(Continued)

*Primary Examiner* — Charles Cooley
(74) *Attorney, Agent, or Firm* — McCoy Russell LLP

(57) ABSTRACT

An agitation/defoaming device is provided, which can independently control revolving and rotational motion and can change a rotational direction relative to a revolving direction without a two-system rotary drive.
The apparatus includes a rotary driving source, a braking device for rotary motions; first and second rotors revolved around revolving shaft, and first and second rotational bodies and container holders pivotally supported by the first rotor. A braking force is applied to the second rotor revolving along with the first rotor, generating a rotational motion, which is transmitted to either the first or second rotational body according to the revolving direction of the first rotor. The rotational motion is then transmitted from the first or
(Continued)

second rotational body to the container holder through the first rotational body, thereby transmitting to the object the rotational motion according to the revolving direction while revolving the object.

20 Claims, 9 Drawing Sheets

(51) Int. Cl.
  *B01F 9/00* (2006.01)
  *B01D 19/00* (2006.01)
  *B01D 19/02* (2006.01)
  *B01F 9/22* (2006.01)
  *B01F 15/00* (2006.01)

(52) U.S. Cl.
  CPC .......... *B01F 9/22* (2013.01); *B01F 15/00538* (2013.01); *F16H 3/44* (2013.01); *F16H 37/065* (2013.01); *B01F 2015/0061* (2013.01); *F16H 2003/442* (2013.01); *F16H 2200/2007* (2013.01)

(58) Field of Classification Search
  CPC ...... B01F 2015/00623; B01F 15/00435; B01F 9/0001; B01F 2015/0061; F16H 2200/2007; F16H 3/721; F16H 3/44; F16H 37/065; F16H 2003/442; B29B 7/845; B29B 7/106

USPC .......................................................... 366/217
  See application file for complete search history.

(56) References Cited

U.S. PATENT DOCUMENTS

| | | | |
|---|---|---|---|
| 2018/0304175 A1* | 10/2018 | Takaoka | ................. B01F 9/003 |
| 2019/0381425 A1* | 12/2019 | Takaoka | ................. B01D 19/02 |
| 2021/0086148 A1* | 3/2021 | Gross | ................. B01F 15/0074 |

FOREIGN PATENT DOCUMENTS

| | | | |
|---|---|---|---|
| JP | 2000271465 A | | 10/2000 |
| JP | 2007190464 A | | 8/2007 |
| JP | 2015016403 A | | 1/2015 |
| JP | 2016073970 A | | 5/2016 |
| JP | 2016209856 A | | 12/2016 |
| JP | 2017080645 A | | 5/2017 |
| WO | 2011/136023 A1 | * | 11/2011 |

OTHER PUBLICATIONS

ISA Japanese Patent Office, International Search Report Issued in Application No. PCT/JP2018/005980, dated Apr. 17, 2018, WIPO, 2 pages.

* cited by examiner

| | clockwise revolution | counterclockwise revolution | configuration | |
|---|---|---|---|---|
| condition A | revolving frequency <br> ‖ <br> rotational frequency | revolving frequency <br> ‖ <br> rotational frequency | first intermediate gear = second intermediate gear <br> first planetary gear = second planetary gear | |
| condition B | revolving frequency <br> ‖ <br> rotational frequency | revolving frequency <br> ∨ <br> rotational frequency | first intermediate gear = second intermediate gear <br> first planetary gear < second planetary gear <br> L(B)=L(A) | |
| condition C | revolving frequency <br> ∨ <br> rotational frequency | revolving frequency <br> ‖ <br> rotational frequency | first intermediate gear = second intermediate gear <br> first planetary gear > second planetary gear <br> L(C)>L(A) | |
| condition D | revolving frequency <br> ‖ <br> rotational frequency | revolving frequency <br> ∧ <br> rotational frequency | first intermediate gear < second intermediate gear <br> first planetary gear = second planetary gear <br> L(D)=L(A) | |
| condition E | revolving frequency <br> ‖ <br> rotational frequency | revolving frequency <br> ∨ <br> rotational frequency | first intermediate gear > second intermediate gear <br> first planetary gear = second planetary gear <br> L(E)=L(A) | |
| condition F | revolving frequency <br> ‖ <br> rotational frequency | revolving frequency <br> ‖ <br> rotational frequency | first intermediate gear < second intermediate gear <br> first planetary gear < second planetary gear <br> L(F)=L(A) | |
| condition G | revolving frequency <br> ∨ <br> rotational frequency | revolving frequency <br> ∨ <br> rotational frequency | first intermediate gear > second intermediate gear <br> first planetary gear > second planetary gear <br> L(G)>L(A) | |

* L(X): Distance between Revolving shaft and Container holder on condition (X) for gears

FIG. 7

# AGITATION/DEFOAMING APPARATUS AND METHOD AND ROTARY MOTION TRANSMISSION DEVICE

CROSS-REFERENCE TO RELATED APPLICATIONS

The present application is a U.S. National Phase of International Patent Application Serial No. PCT/JP2018/005980 entitled "ROTARY MOTION TRANSMISSION DEVICE AND ROTARY MOTION TRANSMISSION METHOD," filed on Feb. 20, 2018. International Patent Application Serial No. PCT/JP2018/005980 claims priority to Japanese Patent Application No. 2017-030761 filed on Feb. 22, 2017 and Japanese Patent Application No. 2017-199256 filed on Oct. 13, 2017. The entire contents of each of the above-referenced applications are hereby incorporated by reference for all purposes.

TECHNICAL FIELD

The present invention relates to a rotary motion transmission device or the like suitable for apparatuses such as an agitation/defoaming apparatus capable of agitating/defoaming an object contained in a container.

BACKGROUND

An agitation/defoaming apparatus for agitating/defoaming an object by revolving and rotating (spinning) a container containing the object is known.

Such an agitation/defoaming apparatus revolves objects, such as a liquid mixed with various liquid materials and an admixture material mixed with powder and liquid materials, and rotates the objects while applying a centrifugal force to them, thereby agitating and defoaming the objects. Both uniformly agitating the objects and reducing air bubbles contained in the objects are required for such an apparatus.

Patent document 1 specifically discloses a device configuration that enables an operator to optionally set a rotational velocity relative to a revolving velocity and that allows the operator to change a rotary frequency and a rotary direction independently from each other in order to widely and successfully agitate and defoam any variety of objects Patent document 2 discloses a method of independently controlling a revolving motion and/or a rotational motion and adopting combined processing conditions including both or either of a rotational direction and a revolving direction that may be reversed.

Patent document 3 discloses a method of utilizing a regenerative resistor control circuit for motors for revolving and rotational motions to accurately control rotary motions.

CITATION LIST

Patent Literature

[Patent Document 1]: Japanese Unexamined Patent Application Publication No. H06-71110
[Patent Document 2]: Japanese Unexamined Patent Application Publication No. 2007-190464
[Patent Document 3]: Japanese Unexamined Patent Application Publication No. 2015-016403

DETAILED DESCRIPTION

Technical Problem

The agitation/defoaming apparatus that can independently control the rotational velocity and the revolving velocity from each other requires including two motors: a first electric motor for the revolving motion; and a second motor for the rotational motions. Each motor also requires to be power supplied. Additionally, the agitation/defoaming apparatus requires a development of a control system for simultaneously and accurately controlling both motors and also a mounting of the control system. For example, Patent document 3 adopts a complicated control technique where a regenerative resistor control circuit is mounted by adding a drive control circuit to a motor control mechanism.

Furthermore, an advanced technology for controlling directions and frequencies of revolving and rotational motions is required to also meet demands for a variety of materials to be agitated/defoamed.

It can increase the cost to produce the agitation/defoaming apparatus that has two rotary drive systems with the motors and the control systems.

To solve the above problem, it is an object of the present invention to provide a device having an advantageous agitation/defoaming functional capability, which can independently control a revolving motion and a rotational (spinning) motion from each other and can change a rotational direction relative to a revolving direction without introducing the expensive two rotary drive systems.

Solution to Problem

According to one aspect of the present invention, an agitation/defoaming apparatus includes
a rotary motion driving source (motor) capable of changing a rotary direction,
a braking device (brake) for rotary motions,
a first rotor that is revolved around a revolving shaft by a rotary power of the rotary motion driving source,
a second rotor where a braking power of the braking device is applied, while the rotary force of the rotary motion driving source makes the second rotor revolve around a revolving shaft,
a container holder pivotally supported by the first rotor, and
a rotary motion transmission part (rotary motion transmitter) revolving along with the first rotor,
a revolving motion is transmitted to the container holder, and
the rotary motion transmission part converts a revolving motion of the rotary motion transmission part relative to the second rotor into a rotational motion in a predetermined direction relative to the rotary motion of the first rotor, and transmits the rotational motion to the container holder.

According to one aspect of the present invention, a rotary motion transmission device includes
a first rotational body (third rotor) and a second rotational body (fourth rotor),
a first rotary motion conversion element (first rotary motion converter) and a second motion conversion element (second rotary motion converter),
a first selective rotary motion transmission element (first selective rotary motion transmitter) allowing only a first rotary motion in a predetermined direction to be transmitted, and
a second selective rotary motion transmission element (second selective rotary motion transmitter) allowing only a second rotary motion, whose direction is opposite to the first rotary motion, to be transmitted.

The first rotational body and the second rotational body are mechanically coupled each other.

The first rotary motion conversion element is coupled to the first rotational body through the first selective rotary motion transmission element, and the second rotary motion conversion element is coupled to the second rotational body through the second selective rotary motion transmission element.

According to any aspect of the present invention, the rotary motion transmission device is characterized
that each of the first rotational body, the second rotational body, the first rotary motion conversion element, and the second motion conversion element is composed of a gear, and
that each of the first selective rotary motion transmission element and the second selective rotary motion transmission element is a one-way rotary motion transmission device.

According to any aspect of the present invention, the agitation/defoaming apparatus is characterized that the rotary motion transmission part is composed of the rotary motion transmission device.

The first rotary motion conversion element and the second motion conversion element are mechanically coupled to the second rotor, and the first rotational body is mechanically coupled to the container holder.

According to any aspect of the present invention, the agitation/defoaming apparatus is characterized that the second rotor is composed of a gear. The container holder is connected to a rotational gear.

According to any aspect of the present invention, such a configuration enables the agitation/defoaming apparatus to revolve a first rotor (revolving gear 5) and a second rotor (sun gear 11) using a rotary driving force of a rotary motion driving source (motor 3).

Then, the agitation/defoaming apparatus revolves first rotational bodies (first intermediate gears 15*a* and 15*b*), second rotational bodies (second intermediate gears 17*a* and 17*b*), container holders (2*a* and 2*b*), first rotary motion conversion elements (first planetary gears 12*a* and 12*b*), and second rotary motion conversion elements (second planetary gears 13*a* and 13*b*) in synchronization with the first rotor.

The rotary frequency of the second rotor (sun gear 11) is controlled by a braking device (8). The first rotary motion conversion elements (first planetary gears 12*a* and 12*b*) and the second rotary motion conversion elements (second planetary gears 13*a* and 13*b*), which are mechanically coupled to the second rotor (sun gear 11), generate rotational motions.

In accordance with the revolving direction of the first rotor (revolving gear 5), the first selective rotary motion transmission elements (first one-way clutches 14*a* and 14*b*) and second selective rotary motion transmission elements (second one-way clutches 16*a* and 16*b*) selectively transmit the generated rotational motions to the first rotational bodies (first intermediate gears 15*a* and 15*b*) or the second rotational bodies (second intermediate gears 17*a* and 17*b*).

The rotational motion can be transmitted from the first rotational bodies (first intermediate gears 15*a* and 15*b*) to the container holders (2*a* and 2*b*), or the rotational motion can be transmitted from the second rotational bodies (second intermediate gears 17*a* and 17*b*) to the container holders (2*a* and 2*b*) through the first rotational bodies (first intermediate gears 15*a* and 15*b*).

Consequently, the revolving motion and the rotational motion, which are to be applied to the objects contained in the containers held in the container holders (2*a* and 2*b*), are independently controlled from each other. The rotational motion in a first rotational direction relative to the first rotor (in a static system of the first rotor) can be applied to the objects in the containers. The direction of the rotational motion can be reversed relative to the revolving direction by changing the direction of the revolving motion.

The above configuration can provide the agitation/defoaming apparatus without using a conventional expensive two rotary drive systems, thus leading to an advantageous agitation/defoaming process with an effective combination of the revolving motion and the rotational motion.

Furthermore, each of the first rotational body, the second rotational body, the first rotary motion conversion element, and the second rotary motion conversion element is composed of a gear. Each of the first selective rotary motion transmission element and the second selective rotary motion transmission element is composed of a one-way rotary motion transmission device. In such a configuration, the mechanical connection between the gears can be easily realized by engaging the gears with each other.

Consequently, the degree of freedom of the arrangement of the container holder, the first and second rotational bodies, and the first and second rotary motion conversion elements can be increased, and space-saving of the apparatus can be achieved. Furthermore, the degree of freedom for setting the control range of the rotational motion can be increased, and further the control range of a centrifugal force applied to the objects can be changed.

According to any aspect of the present invention, the first rotary motion converter converts a revolving motion of the rotary motion transmitter relative to the second rotor into a first rotational motion and the second rotary motion converter converts a revolving motion of the rotary motion transmitter relative to the second rotor into a second rotational motion.

The agitation/defoaming apparatus is characterized that the first rotational motion or the second rotational motion is transmitted to the container holder and that frequencies of the first rotational motion and the second rotational motion may be different from each other.

In such a configuration, the degree of freedom of the control range of the rotational and revolving motions can be increased to determine each suitable condition for the agitation process and the defoaming process, and thus, an advantageous agitation/defoaming process condition can be obtained.

According to one aspect of the present invention, a method for agitating/defoaming an object includes revolving a first rotor using a rotary motion applied from a rotary motion driving source.

While a second rotor follows the first rotor and revolves, a braking force is applied to
the second rotor and the braking force controls a rotary frequency (rotational frequency) of the second rotor to be equal
to or less than a rotary frequency of the first rotor.

A first rotary motion conversion element and a second rotary motion conversion element are revolved along with the first rotor, and thus, the first rotary motion conversion element and the second rotary motion conversion element are revolved relative to the second rotor.

The first and second rotary motion conversion elements generate a rotational motion from the revolving motion relative to the second rotor.

If revolving directions of the first and second rotary motion conversion elements are in a predetermined direction relative to the second rotor, a first selective rotary motion transmission element transmits a revolving motion and a rotational motion of the first rotary motion conversion element to a first rotational body.

While rotatably supporting a second rotational body, a second selective rotary motion transmission element transmits a revolving motion of the second rotary motion conversion element to the second rotational body. Subsequently, the rotational motion is transmitted from the first rotational body to the second rotational body.

If the revolving directions of the first and second rotary motion conversion elements are in a direction opposite to the predetermined direction relative to the second rotor, the second selective rotary motion transmission element transmits a revolving motion and a rotational motion of the second rotary motion conversion element to the second rotational body.

While rotatably supporting the first rotational body, the first selective rotary motion transmission element transmits a revolving motion of the first selective rotary motion transmission element to the first rotational body. Subsequently, the rotational motion is transmitted from the second rotational body to the first rotational body.

Consequently, at least one of the first and second rotational bodies transmits the revolving and rotational motions to a container containing the object to be processed, enabling the object to be revolve and rotated and to be agitated/defoamed accordingly.

Such an agitation/defoaming method enables the object to be advantageously agitated/defoamed, and also the processing condition can be easily optimized. Additionally, it leads to reduced labor and cost to optimize the processing condition.

According to one aspect of the present invention, a rotary motion transmission device is suitable for a agitation/defoaming apparatus. The agitation/defoaming apparatus includes a rotary motion driving source capable of changing a rotary direction, a revolving shaft, a first rotor and a second rotor revolving around the revolving shaft, a braking device applying a braking force to the first rotor, and a container holder that is pivotally supported by the first rotor and that extends a rotary motion to a container containing an object.

The rotary motion transmission device converts a relative motion of the first rotor relative to the second rotor into a rotational motion and transmits the rotational motion to the container holder.

The rotary motion transmission device includes
a first rotational body and a second rotational body,
a first rotary motion conversion element and a second rotary motion conversion element,
a first selective rotary motion transmission element allowing only a rotary motion in a predetermined direction to be transmitted, and
a second selective rotary motion transmission element allowing only a rotary motion in a direction opposite to the predetermined direction, which is allowed by the first selective rotary motion transmission element, to be transmitted.

The first rotational body and the second rotational body are mechanically coupled each other. The first rotary motion conversion element is coupled to the first rotational body through the first selective rotary motion transmission element, and the second rotary motion conversion element is coupled to the second rotational body through the second selective rotary motion transmission element.

According to any aspect of the present invention, in such a configuration, the rotary motion transmission device can revolve the first rotor (revolving gear 5) and the second rotors (sun gears 11) using a rotary driving force of the rotary motion driving source (motor 3).

Then, the rotary motion transmission device can revolve the first rotational bodies (first intermediate gears 15a and 15b), the second rotational bodies (second intermediate gears 17a and 17b), the container holders (2a and 2b), the first rotary motion conversion elements (first planetary gears 12a and 12b), and the second rotary motion conversion elements (second planetary gears 13a and 13b) in synchronization with the revolving motion of the first rotor.

The rotary motion transmission device uses the first rotary motion conversion elements (first planetary gears 12a and 12b) and the second rotary motion conversion elements (second planetary gears 13a and 13b) to generate a rotational motion from a relative rotary motion of the first rotor relative to the second rotor. The relative rotary motion is generated by applying a braking force to the first rotor.

In accordance with a revolving direction of the first rotor (revolving gear 5), the first selective rotary motion transmission elements (first one-way clutches 14a and 14b) and second selective rotary motion transmission elements (second one-way clutches 16a and 16b) transmit the generated rotational motions selectively to the first rotational bodies (first intermediate gears 15a and 15b) or the second rotational bodies (second intermediate gears 17a and 17b). The rotational motion is transmitted from the first rotational bodies (first intermediate gears 15a and 15b) to the container holders (2a and 2b), or the rotational motion is transmitted from the second rotational bodies (second intermediate gears 17a and 17b) to the container holders (2a and 2b) through the first rotational bodies (first intermediate gears 15a and 15b).

Consequently, the rotational motion in a predetermined direction relative to the revolving direction of the first rotor (relative to a static system of the first rotor) can be applied to the objects contained in the containers held in the container holders (2a and 2b). Changing (reversing) a revolving direction also inverses a rotational direction relative to the revolving direction.

According to any aspect of the present invention, the rotary motion transmission device is characterized
that the first and second rotary motion conversion elements are pivotally supported by the first rotor and are mechanically coupled to the second rotor, and
that the first rotational body is mechanically coupled to the container holder.

Such a configuration enables the first and second rotary motion conversion elements to revolve in synchronization with the revolving motion of the first rotor and to mechanically couple to the second rotor whose rotary frequency is controlled. The relative rotary motion of the first rotor relative to the second rotor makes the first and rotary motion conversion elements revolve and can generate a rotational motion. The generated rotational motion can be transmitted to the container holder through the first rotational body.

According to any aspect of the present invention, the rotary motion transmission device is characterized that each of the first selective rotary motion transmission element and the second selective rotary motion transmission element may be a one-way rotary motion transmission device.

According to any aspect of the present invention, the rotary motion transmission device is characterized that the one-way rotary motion transmission device may be a one-way clutch.

With such a configuration, the rotational motion in a predetermined direction relative to the revolving direction of the first rotor (relative to a static system of the first rotor) can be transmitted to the object in the container without a complicated control.

According to any aspect of the present invention, the rotary motion transmission device is characterized that each of the first rotational body, the second rotational body, the first rotary motion conversion element, and the second motion conversion element is composed of a gear.

With such a configuration, the rotary motion transmission device can be miniaturized and power saved, and accuracy of the rotary motion control can be raised. Additionally, the rotary frequency can be easily changed just by changing the teeth number of the gears.

According to any aspect of the present invention, the rotary motion transmission device is characterized that a first rotary frequency transmitted to the first rotational body may be different from a second rotary frequency transmitted to the second rotational body.

From the relative rotary motion of the first rotor relative to the second rotor, rotational motions with different rotational frequency can be transmitted to the first rotational body and the second rotational body respectively. Consequently, the rotational frequency of the container holder can be easily changed in accordance with the revolving direction of the first rotor.

Advantageous Effects of Invention

According to any aspect of the present invention, the rotary motion transmission device enables the revolving direction and the rotational direction to be relatively inverted and allows the revolving speed and the rotational speed to be independently controlled from each other. It leads to the agitation/defoaming apparatus or the like that can effectively agitate/defoam the object without introducing an expensive two rotary drive systems.

BRIEF DESCRIPTION OF THE FIGURES

FIG. 7 is a table including cross-sectional views of the agitation/defoaming apparatus according to variations of the present invention, illustrating configurations of the main gears;

EMBODIMENTS

Embodiments of the present invention will be described below with reference to drawings. However, each embodiment should not be interpreted so as to limit the gist of the invention. The same or similar members are identified with the same reference symbols, and the description may be omitted.

First Embodiment

Configurations and operation principles of an agitation/defoaming apparatus according to a first embodiment of the present invention will be described below in detail.

Apparatus Configuration

Figure 1A:
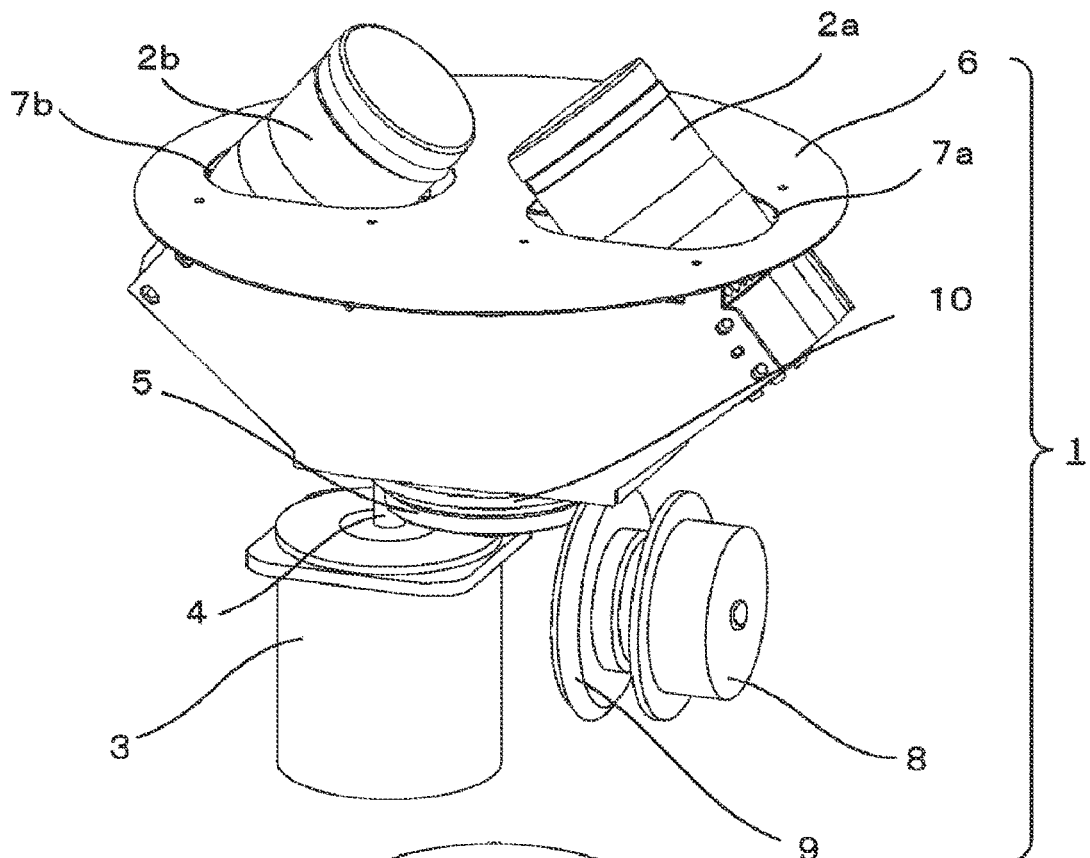
FIG. 1A is a perspective view of a part of a main configuration of an agitation/defoaming apparatus according to a first embodiment of the present invention.
Figure 1B:
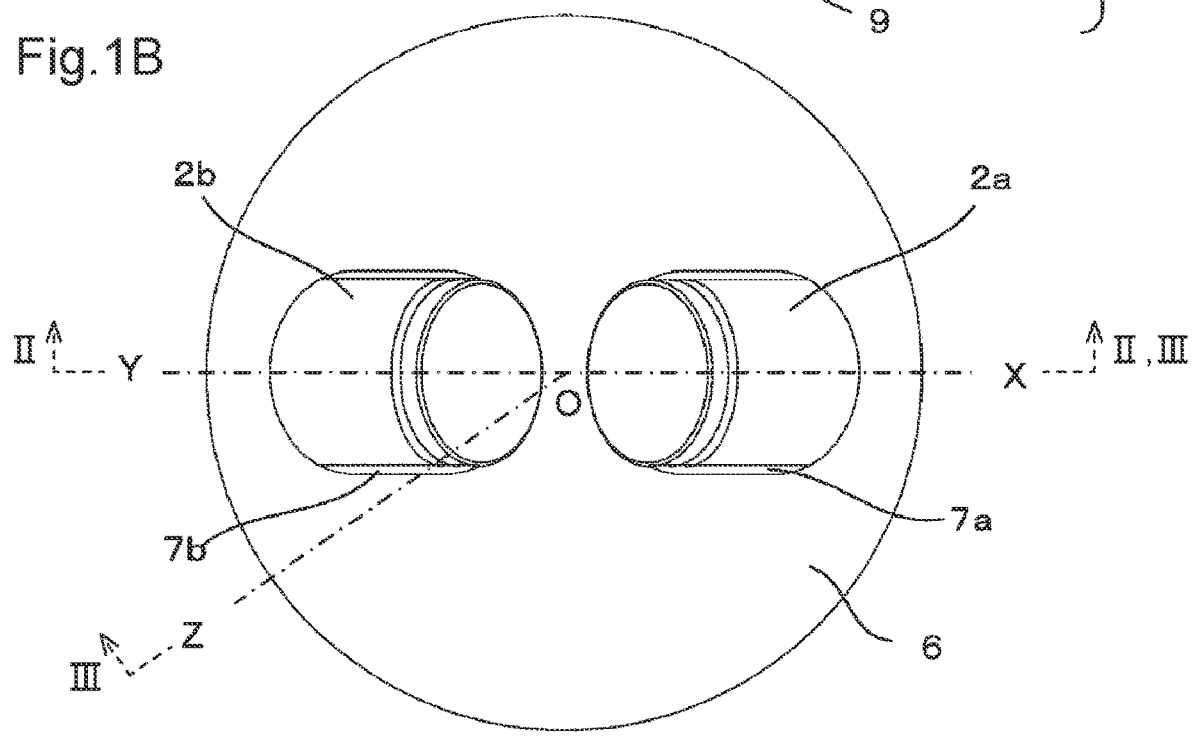
FIG. 1B is a top view of a part of the main configuration of the agitation/defoaming apparatus according to the first embodiment of the present invention.
Figure 2:
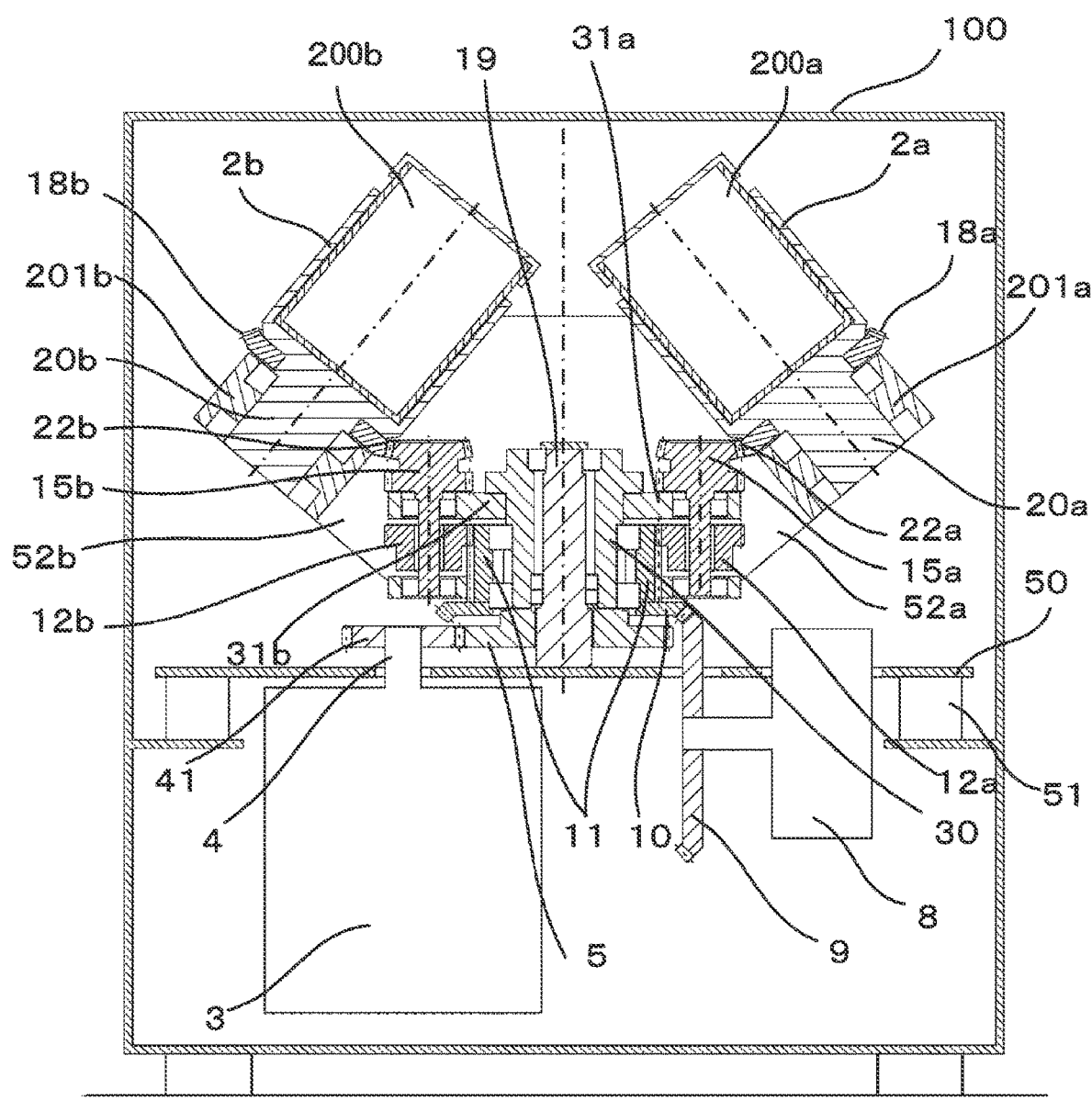
FIG. 2 is a cross-sectional view of the agitation/defoaming apparatus taken along the line II-II of FIG. 1B according to the first embodiment of the present invention.
Figure 3:
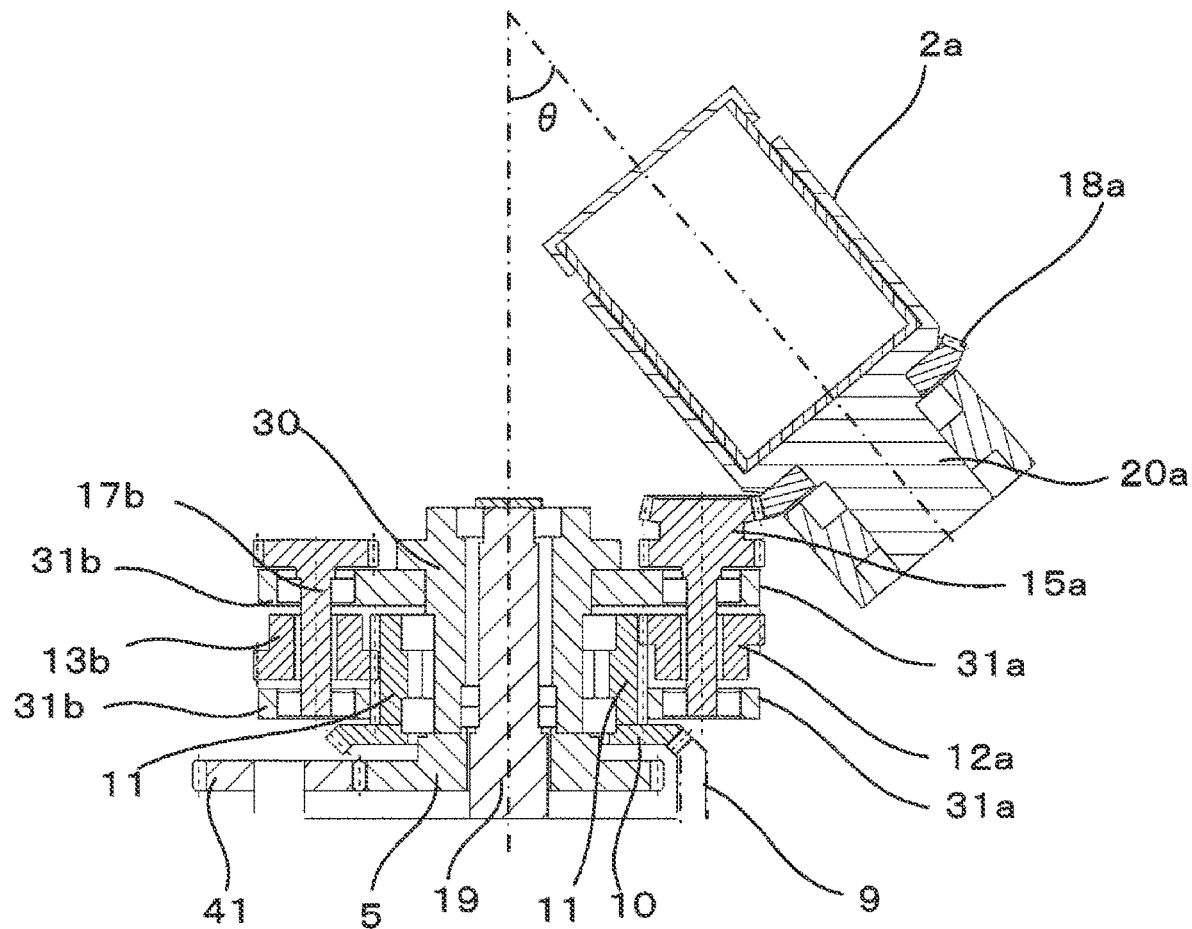
FIG. 3 is a cross-sectional view of the agitation/defoaming apparatus taken along the line III-III of FIG. 1B according to the first embodiment of the present invention.

FIGS. 1A and 1B are respectively a perspective view and a top view of a part of a main configuration of the agitation/defoaming apparatus 1 according to the first embodiment. FIG. 2 is a cross-sectional view of the agitation/defoaming apparatus 1 taken along the line II-II of FIG. 1B, and FIG. 3 is a partial cross-sectional view of the agitation/defoaming apparatus 1 taken along the line III-III of FIG. 1B. Each of them shows a main configuration inside the agitation/defoaming apparatus 1. The configuration of the agitation/defoaming apparatus 1 will be described in detail with reference to FIGS. 1A, 1B, 2, and 3.

The agitation/defoaming apparatus 1 includes container holders 2a and 2b supporting containers containing objects to be processed and a motor 3 as a driving source for a rotary motion (revolving and rotational motions) of the container holders 2a and 2b. The rotary motion of a rotary shaft 4 generated by the motor 3 is transmitted to a revolving gear 5 as a first rotor. While rotating the container holders 2a and 2b, the transmitted rotary motion revolves the container holders 2a and 2b around a revolving shaft 19 represented as "O" in FIG. 1B (see FIG. 2).

In one example, the container holders 2a and 2b projecting from openings 7a and 7b of a cover member 6 are illustrated in FIG. 1A, but any other configurations can also be selected so as correspond to the configuration of the containers 200a and 200b and the container holders 2a and 2b.

The motor 3 whose rotary speed (rotary frequency) and rotary direction can be variably controlled, that is, a motor capable of turning in normal and reverse directions, and whose rotary frequency can be optionally set by the operator is used.

Alternatively, the motor 3 including a rotary shaft enabling a rotational drive only in a predetermined direction is combined with a rotary direction conversion part allowing the rotary direction to be converted (turned) using gears or the like, and a rotary motion driving source capable of turning in normal and reverse directions can be configured by the combination.

The agitation/defoaming apparatus 1 can also include a power supplying line, a control system, an operation panel, storage, and other devices (not shown).

The agitation/defoaming apparatus 1 further includes a braking device 8, such as a powder brake, that applies a braking force to rotary motions. The powder brake whose braking force can be continuously and stepwisely controlled by a driving currents or a driving voltage and can act in any rotary directions is adopted. The braking method includes various types, and examples of the braking method includes PWM control, PAM control, and feedback control.

The braking force of the braking device 8 is transmitted through a first brake gear 9 coupled to the braking device 8. The braking device 8 is not limited to the powder brake and may be an electric brake, such as a power generation braking and a regeneration brake, or any device that can electrically control its braking force.

As shown in FIG. 2, the agitation/defoaming apparatus 1 is covered by a housing 100 to protect the entire apparatus. The motor 3 and the braking device 8 are secured to a base plate 50, and the base plate 50 is secured to the housing through a vibration control device 51. That means that the motor 3 and the braking device 8 are secured to the housing 100 through the base plate 50 and the vibration control device 51, which configure a vibration control mechanism, thus preventing unnecessary vibration from being transmitted mutually.

The revolving gear 5 is pivotally attached to the revolving shaft through a bearing. The revolving gear 5 also engages with a gear 41 coupled to the rotary shaft 4 of the motor 3, and thus, the rotary motion driven by the motor 3 is transmitted to the revolving gear 5.

The revolving gear 5 is coupled to a rotary drum 30 including rotary arms 31a and 31b respectively corresponding to the container holders 2a and 2b. Accordingly, the revolving gear 5, the rotary drum 30, and the rotary arms 31a and 31b integrally form one rotary body, and they revolve while pivotally supporting the container holders 2a and 2b. Consequently, the container holders 2a and 2b can be revolved around the revolving shaft 19.

The container holders 2a and 2b solidly hold the containers 200a and 200b containing the objects, and the rotary motions of the container holders 2a and 2b are respectively transmitted to the containers 200a and 200b.

The container holders 2a and 2b, whose main portions are cylindrical, are respectively coupled to rotational gears 18a and 18b so as to align the center axes of the container holders with those of the rotational gears.

The rotational gear 18a and 18b are coupled to rotational shafts 20a and 20b, and the rotational shafts 20a and 20b are pivotally supported by support bodies 201a and 201b through bearings.

The support bodies 201a and 201b are coupled to the rotary arms 31a and 31b through side plates 52a and 52b. Such a configuration enables the container holders 2a and 2b to rotate around the rotational shafts 20a and 20b while the container holders 2a and 2b are being revolved.

The container holders 2a and 2b and the containers 200a and 200b may also be integrally formed. Any containers capable of containing the object and revolving and rotating may be used. If the other containers having different shapes are held instead of dedicated containers for the container holders 2a and 2b, adapters for holding them may be used. It allows the objects to be processed without transferring the object from a container to the dedicated container.

The rotational gears 18a and 18b engage with first intermediate gears 15a and 15b at engagement parts 22a and 22b, and the rotational gear 18a and 18b (and the container holders 2a and 2b) are mechanically coupled directly to the first intermediate gears 15a and 15b.

Furthermore, the first intermediate gears 15a and 15b engage with second intermediate gears 17a and 17b that will be described below, and the first intermediate gears 15a and 15b are mechanically coupled directly to the second intermediate gears 17a and 17b. Consequently, the rotary motion is transmitted from the first intermediate gears 15a and 15b the second intermediate gears 17a and 17b, but the rotary direction is to be inverted and transmitted.

The expression "mechanically coupled" means that the rotary motion is transmitted and pivotally supported, and the expression "coupled directly" means that the rotary motion is transmitted without going through any other rotor transmitting the rotary motion. Consequently, the rotor (gear) pivotally supported may be interposed for "mechanically coupled."

The rotational shafts 20a and 20b can be placed parallel to a vertical direction. Alternatively, the rotational shafts 20a and 20b can be slanted by a desired angle θ (see FIG. 3), for example, 20° to 70° and preferably 40°, to the vertical direction at the engagement parts 22a and 22b, when bevel gears are used.

The first intermediate gears 15a and 15b and the second intermediate gears 17a and 17b, which are pivotally attached to the rotary arms 31a and 31b through bearings, respectively configure a first rotational body and a second rotational body. The first and second rotational bodies can be rotated while being revolved with the corresponding rotary arms 31a and 31b.

A sun gear 11 as a second rotor is pivotally supported by the rotary drum 30 through a bearing, and both of the sun gear 11 and the rotary drum 30 are pivotally attached to the revolving shaft 19.

The sun gear 11 is coupled to a second brake gear 10, and the second brake gear 10 engages with the first brake gear 9. Since the first brake gear 9 is coupled to the braking device 8, the braking force of the braking device 8 is transmitted to the sun gear 11 through the first brake gear 9 and the second brake gear 10.

Figure 4A:
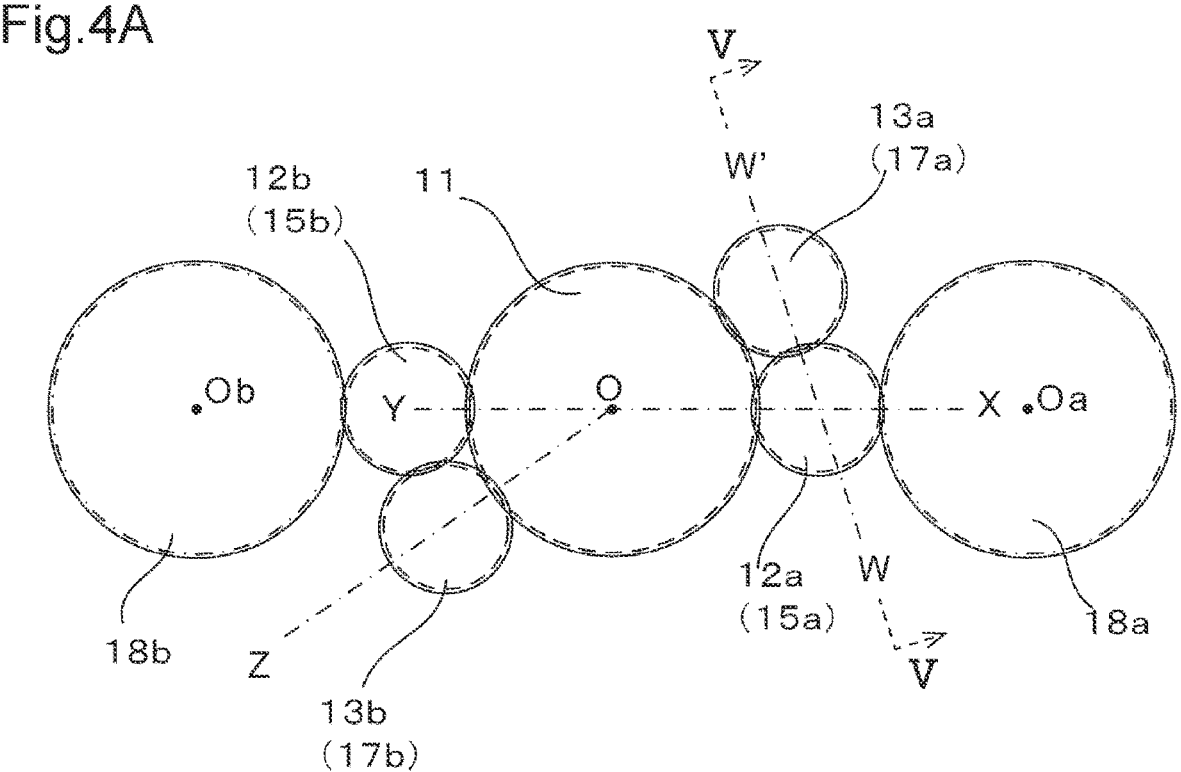
FIG. 4A is a top view of the agitation/defoaming apparatus according to the first embodiment of the present invention, schematically illustrating main gears.
Figure 4B:
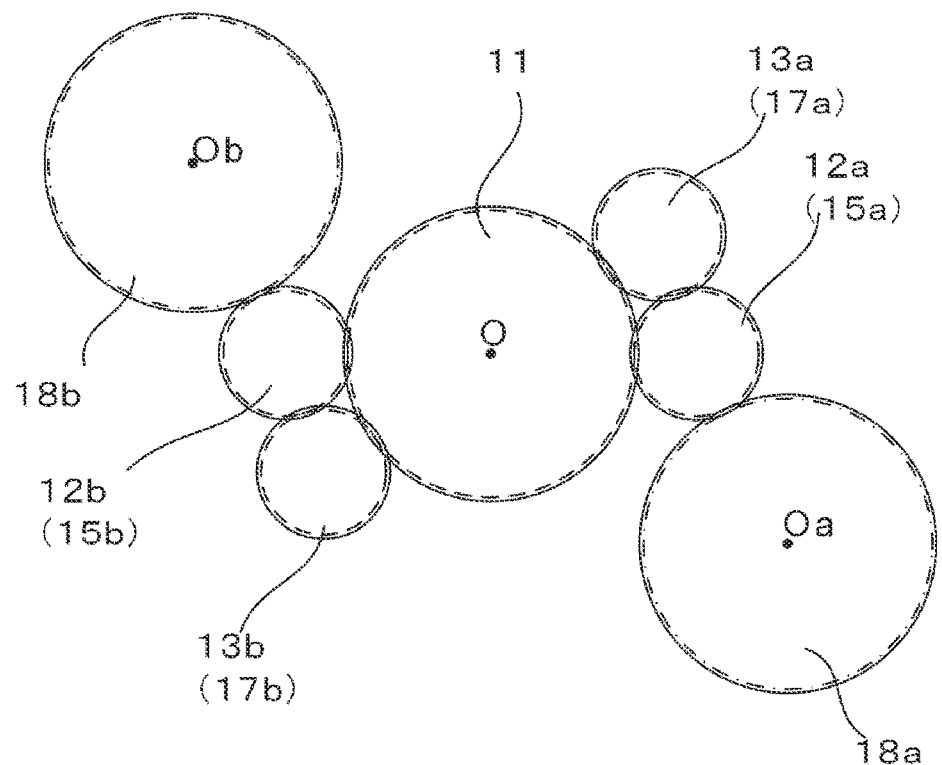
FIG. 4B is a top view of the agitation/defoaming apparatus according to the first embodiment of the present invention, schematically illustrating main gears.
Figure 5:
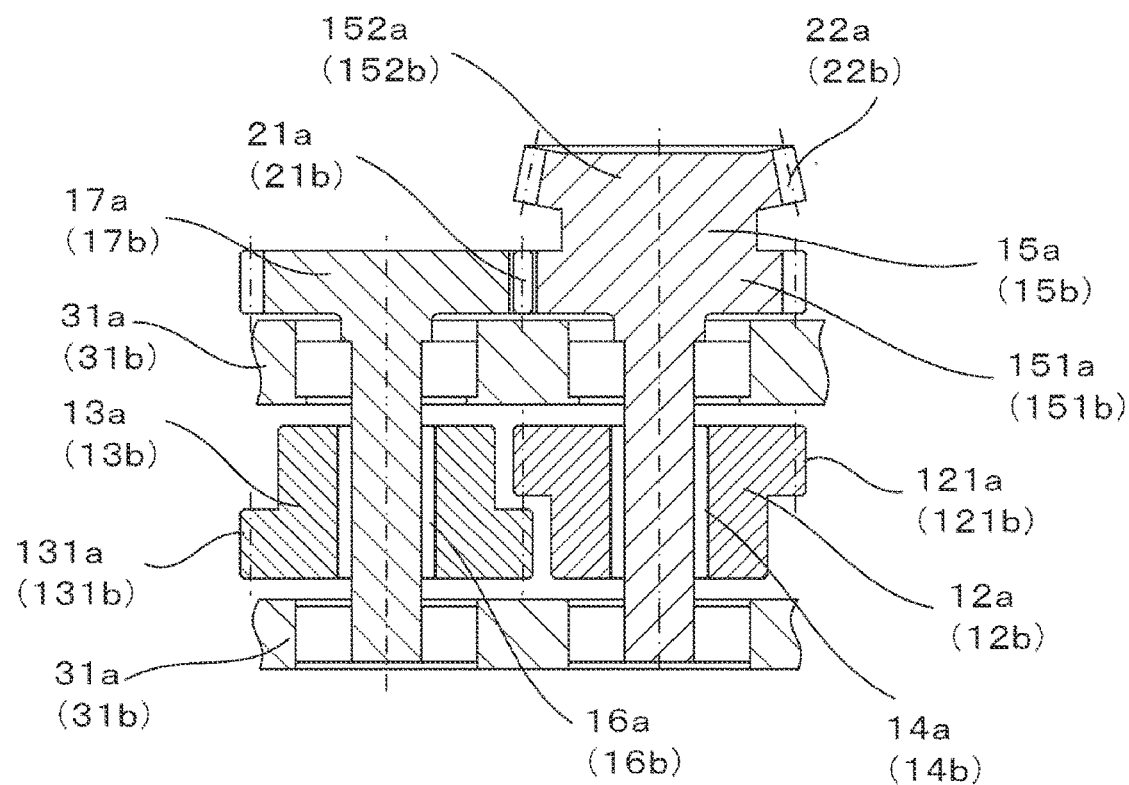
FIG. 5 is a cross-sectional view of the agitation/defoaming apparatus taken along the line V-V of FIG. 4A according to the first embodiment of the present invention.

A first planetary gear 12a (12b) and a second planetary gear 13a (13b) (see FIGS. 4A, 4B, and 5) are pivotally attached to the rotary arm 31a (31b) and engage with the sun gear 11 at corresponding engagement parts 121a (121b) and 131a (131b) as shown in FIG. 5 in detail.

In this configuration, as described below, the braking force transmitted to the sun gear 11 through the first brake gear 9 and the second brake gear 10 can generate a rotary motion (rotational motion), while the rotary motion of the rotary arms 31a and 31b coupled to the revolving gear 5 through the rotary drum 30 revolves the first planetary gears 12a and 12b and second planetary gears 13a and 13b relative to the sun gear 11.

Additionally, when the braking force transmitted through the first brake gear 9 and the second brake gear 10 is "zero", a driving force of the rotary motion does not exceed a start point where a rotational motion starts to be generated, and thus the rotational motion is not transmitted. In this case, the sun gear 11 configures to revolve along with the rotary drum.

The rotary arms 31a and 31b are, but not limited to, rectangular parallelepipeds. For example, one circle plate may be prepared, and the first planetary gears 12a and 12b and the second planetary gears 13a and 13b may be pivotally attached to the circle plate. With the circle plate, freedom of placement of the gears and the number of the container holders can be increased.

FIGS. 4A and 4B are top views of positional relation schematically illustrating the sun gear 11, the first planetary gears 12a and 12b (first intermediate gears 15a and 15b), the second planetary gears 13a and 13b (second intermediate gears 17a and 17b), and the rotational gears 18a and 18b.

The rotational gears 18a and 18b, which are illustrated to slant relative to a vertical direction in FIGS. 1 to 3, are illustrated not to slant in FIGS. 4A and 4B in order to facilitate understanding coupling conditions of each gear.

The first planetary gears 12a and 12b and the first intermediate gears 15a and 15b are respectively stacked one another and their axes coincide with each other, and the second planetary gears 13a and 13b and the second intermediate gears 17a and 17b are also respectively stacked one another and their axes coincide with each other. Accordingly, the above stacked gears are respectively illustrated as one circle in FIGS. 4A and 4B.

Each gear in FIGS. 4a and 4b is a mere example, and is not limited to a particular size. The first planetary gears 12a and 12b and the first intermediate gears 15a and 15b are unnecessary to have the same diameter as well as the second planetary gears 13a and 13b and the second intermediate gears 17a and 17b.

A line X-O-Y illustrated in FIG. 4A is the same as a line Y-O-Y illustrated in FIG. 1B, a line O-X is a straight line passing through the revolving shaft 19 and the center axis of the first planetary gear 12a, a line O-Y is a straight line passing through the revolving shaft 19 and the center axis of the second planetary gear 13b, and a line W-W' is a straight line passing through the center axes of the first planetary gear 12a and the second planetary gear 13a.

As illustrated in FIG. 4A, the sun gear 11 engages with the first planetary gears 12a and 12b and the second planetary gears 13a and 13b.

Each of the rotational gears 18a and 18b, the first intermediate gears 15a and 15b, and the second gears 17a and 17b can rotate. The rotational gears 18a and 18b engage with the corresponding first intermediate gears 15a and 15b, and the intermediate gears 15a and 15b engage with the corresponding second intermediate gears 17a and 17b.

This means that, for the container holders 2a and 2b coupled to the rotational gears 18a and 18b, two routes are available: one transmission path for transmitting the rotational motions of the first intermediate gears 15a and 15b (the first rotational bodies); and the other path for transmitting the rotational motions of the second intermediate gears 17a and 17b (the second rotational bodies) through the first intermediate gears 15a and 15b.

Consequently, the rotary speed of the container holder 2a (2b) depends on a gear ratio A of the first intermediate gear 15a (15b) to the rotational gear 18a (18b) and a gear ratio B of the second intermediate gear 17a (17b) to the first intermediate gear 15a (15b), and as described below, depends on a gear ratio C of the sun gear 11 to the first planetary gear 12a (12b) through the first intermediate gear 15a (15b) and a gear ratio D of the sun gear 11 to the second planetary gear 13a (13b) through the second intermediate gear 17a (17b).

The rotational gears 18a and 18b do not engage with the first planetary gears 12a and 12b and the second planetary gears 13a and 13b. The configuration of each gear will be described below.

FIG. 4A includes an example where each center of the sun gear 11, the first planetary gears 12a and 12b (first intermediate gears 15a and 15b), and the rotational gears 18a and 18b is aligned. However, the arrangement is not limited to the above example.

As illustrated in FIG. 4B, each center of the sun gear 11 and the first planetary gear 12a (12b) (first intermediate gear 15a (15b)) may be aligned, and each center of the sun gear 11 and the rotational gear 18a (18b) may be aligned.

Compared with a first distance from the center point O of the sun gear 11 to the center point Oa (Ob) of the rotational gears 18a (18b) in FIG. 4A, a second distance from the center point O of the sun gear 11 to the center points Oa (Ob) of the rotational gear 18a (18b) in FIG. 4B is shorter.

Since the center axis of the sun gear 11 coincide with the revolving shaft, the above means that a distance from the revolving shaft to the rotational gear 18a (18b) of the container holder 2a (2b) can also be changed. Such a distance from the revolving shaft can be changed in order to change a centrifugal force generated by the revolving force.

As described above, the centrifugal force can be easily changed, without replacing each gear, by changing positions of the rotational gear 18a (18b), and thus, the centrifugal force generated can be changed with the revolving frequency unchanged. Alternately, the revolving frequency can be changed while the centrifugal force is unchanged. Such a configuration can enlarge a control range of the centrifugal force and can broaden an advantageous control range for agitating/defoaming object.

The distance can be changed in the above way, because the rotational motion of the rotational gear 18a (18b) is surely transmitted through the first rotational gear 18a (18b).

When the agitation/defoaming apparatus 1 is configured so that the arrangement of the rotational gears 18a and 18b can be changed, for example, rectangular parallelepiped aids may be prepared to keep a distance between the rotational gear 18a (18b) and the first intermediate gear 15a (15b) constant. Subsequently, the rotational gear 18a may be pivotally attached to one end of a first aid through a bearing, and the first intermediate gear 15a may be pivotally attached to the other end of the first aid through a bearing. Likewise, each of the rotational gear 18b and the first intermediate gear 15b may be pivotally attached to the corresponding ends of a second aid. Additionally, the aids are configured so as be secured to each of the rotary arms 31a and 31b at a desired position.

In one example, the above configuration can be easily achieved by adopting one circular plate instead of the rotary arms 31a and 31b.

FIG. 5, which is a cross-sectional view of the agitation/defoaming apparatus taken along a line V-V of FIG. 4A, for the container holder 2a, illustrates each configuration of the first planetary gear 12a, the second planetary gear 13a, the first intermediate gear 15a, and the second intermediate gear 17a. The mechanism section showed in FIG. 5 configures the rotary motion transmission device that converts the revolving motion into the rotational motion and transmits the rotary (revolving and rotational) motion to the container holder 2a (2b).

The same holds for the container holder 2b. The reference signs in parentheses in FIG. 5 are the first planetary gear 12b, the second planetary gear 13b, or the like corresponding to the container holder 2b.

As shown in FIG. 5, the first intermediate gear 15a (15b) includes a first transmission gear 151a (151b) and a second transmission gear 152a (152b), the first intermediate gear 15a (15b) engages with the second intermediate gear 17a (17b) at a first engagement part 21a (21b) of the first transmission gear 151a (151b). Such a configuration enables the rotary motion to be transmitted.

Furthermore, the second transmission gear 152a (152b) engages with the rotational gear 18a (18b) at a second engagement part 22a (22b).

The first intermediate gear 15a (15b) may include only the first transmission gear 151a (151b), and the first transmission gear 151a (151b) is configured to engage with both of the second intermediate gear 17a (17b) and the rotational gear 18a (18b), instead of including two gears of the first transmission gear 151a (151b) and the second transmission gear 152a (152b).

However, in such a configuration where the first intermediate gear 15a (15b) includes two gears, it is easily set a first gear ratio of the first intermediate gear 15a (15b) to the second intermediate gear 17a (17b) and a second gear ratio of the first intermediate gear 15a (15b) to the rotational gear 18a (18b) independently. Furthermore, the first gear ratio of the first intermediate gear 15a (15b) to the second intermediate gear 17a (17b) and the distance between the revolving shaft 19 and the rotational gear 18a (18b) can be set more freely, and the space for the agitation/defoaming apparatus 1 can also be saved.

The first planetary gear 12a (12b) is coupled to the first intermediate gear 15a (15b) through a first one-way clutch 14a (14b) (first selective rotary motion transmission element), and the second planetary gear 13a (13b) is coupled to the second intermediate gear 17a (17b) through a second one-way clutch 16a (16b) (second selective rotary motion transmission element).

In this configuration, the selective rotary motion transmission element is a coupling device for transmitting rotary motion. Upon receiving a rotary motion in a predetermined one direction, the selective rotary motion transmission element is characterized to transmit the rotary motion by fixing coupling objects each other. However, upon receiving a rotary motion in a direction opposite to the predetermined one direction, the selective rotary motion transmission element is characterized to pivotally support the coupling objects without fixing the coupling objects each other and not to transmit any rotary motion. In the other words, the selective rotary motion transmission element is a rotary motion transmission element that can selectively transmit rotary motions according to the rotary direction.

For the selective rotary motion transmission element, a device that transmits a rotary power in one direction (one-way rotary motion transmission device), such as a one-way clutch, can be preferably used. However, any elements having the above characteristic, not limited to the one-way clutch, can be used.

The first one-way clutch 14a (14b) and the second one-way clutch 16a (16b) are combined so as to transmit rotary motions in inverse directions each other. For example, the first one-way clutch 14a (14b) and the second one-way clutch 16a (16b) can be combined as below: while the first one-way clutch 14a (14b) transmits a rotary motion in only a clockwise direction, the second one-way clutch 16a (16b) transmits a rotary motion in only a counterclockwise direction; or while the first one-way clutch 14a (14b) transmits the rotary motion in only the counterclockwise direction, the second one-way clutch 16a (16b) transmits the rotary motion in only the clockwise direction.

The first one-way clutch 14a (14b) is coupled to the first planetary gear 12a (12b). When the first planetary gear 12a (12b) rotates in a predetermined one direction, the first one-way clutch 14a (14b) secures (couples) the first intermediate gear 15a (15b) so as to transmit the rotary motion to the first intermediate gear 15a (15b). Alternatively, when the first planetary gear 12a (12b) rotates in a direction opposite to the predetermined one direction, the first one-way clutch 14a (14b) releases but pivotally supports the first intermediate gear 15a (15b) so as not to transmit the rotary motion to the first intermediate gear 15a (15b).

Likewise, the second one-way clutch 16a (16b) is coupled to the second planetary gear 13a (13b). When the second planetary gear 13a (13b) rotates in a predetermined one direction, the second one-way clutch 16a (16b) secures (couples) the second intermediate gear 17a (17b) so as to transmit the rotary motion to the second intermediate gear 17a (17b). Alternatively, when the second planetary gear 13a (13b) rotate in a direction opposite to the predetermined one direction, the second one-way clutch 16a (16b) releases but pivotally supports the second intermediate gear 17a (17b) so as not to transmit the rotary motion to the second intermediate gear 17a (17b).

While the first planetary gear 12a (12b) and the second planetary gear 13a (13b) synchronously rotate in the same direction, the rotational motions of them are respectively transmitted to the first intermediate gear 15a (15b) and the second intermediate gear 17a (17b). The above configuration where the first one-way clutch 14a (14b) is combined with the second one-way clutch 16a (16b) transmits the rotational motion selectively to either one of the first intermediate gear 15a (15b) or the second intermediate gear 17a (17b) in accordance with the revolving direction of the revolving gear 5.

Operation Principle

An operation principle of the agitation/defoaming apparatus 1 will be described with reference to drawings.

Figure 6A:
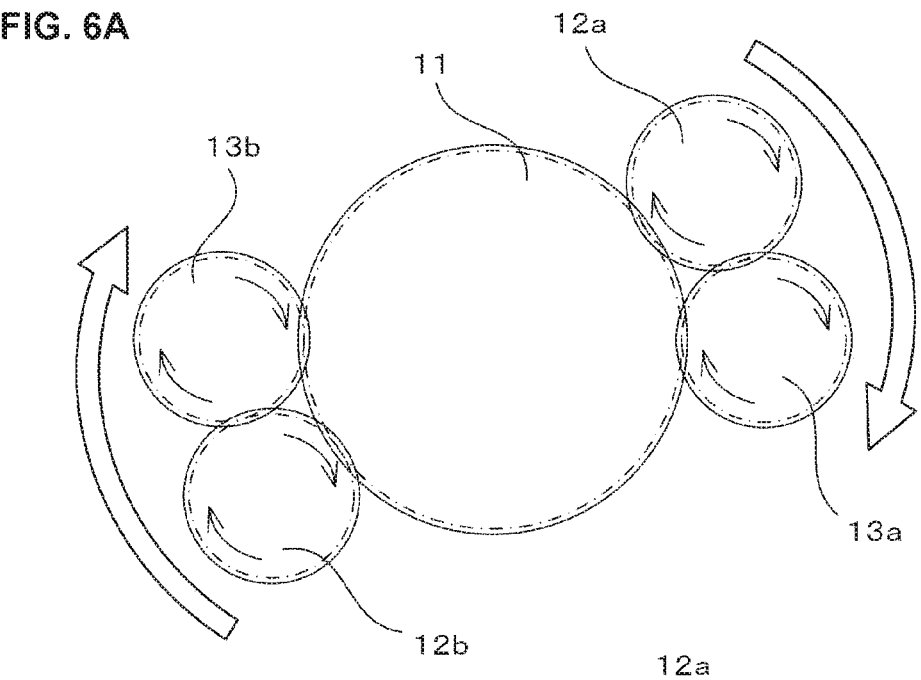
FIG. 6A is a top view of the agitation/defoaming apparatus according to the first embodiment of the present invention, schematically illustrating rotary motions of a sun gear and first and second planetary gears.
Figure 6B:
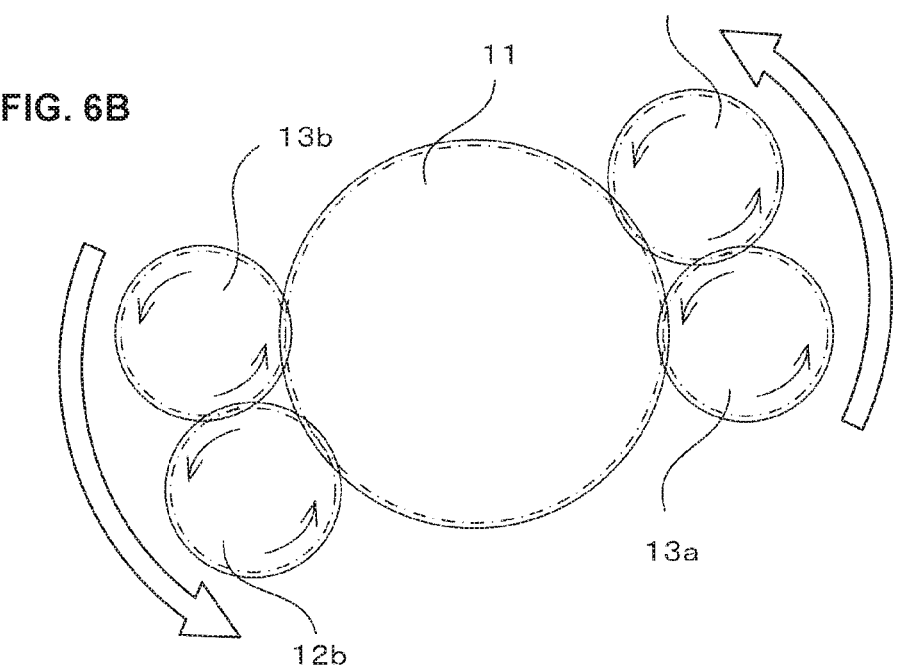
FIG. 6B is a top view of the agitation/defoaming apparatus according to the first embodiment of the present invention, schematically illustrating rotary motions of the sun gear and the first and second planetary gears.

FIGS. 6A and 6B are diagrams illustrating relations of relative rotary motions among the sun gear 11, first planetary gears 12a and 12b, and second planetary gears 13a and 13b. FIG. 6A illustrates one relative rotary motion for the revolving gear 5 revolving clockwise relative to a static system of the housing 100 (coordinate system not revolved and based on the housing 100), and FIG. 6B illustrates the other relative rotary motion for the revolving gear 5 revolving counterclockwise relative to the static system of the housing 100.

Since the term "static system" is a physical term (academic term) generally used for relative motions in physics, the details are omitted. Likewise, the descriptions in parentheses, which are for facilitating understanding, may be appended below.

FIGS. 6A and 6B illustrate a state where the braking force applied to the sun gear 11 makes the first planetary gears 12a and 12b and the second planetary gears 13a and 13b be moving relative to the sun gear 11. This shows the rotary motion in a static system of the sun gear 11 (that is, a coordinate system revolving along with the sun gear 11), and the rotary direction in the static system of the sun gear 11 is not always the same as the rotary direction of the static system of the housing 100.

In FIGS. 6A and 6B, thick arrows show relative motions of the first planetary gears 12a and 12b and the second planetary gears 13a and 13b relative to the sun gear 11, and thin arrows show rotational motions of the first planetary gears 12a and 12b and the second planetary gears 13a and 13b.

As seen in FIG. 5, since the first planetary gear 12a does not directly engage with the second planetary gear 13a, the first planetary gear 12a and the second planetary gear 13a can rotate in the same direction. The same also holds for the first planetary gear 12b and the second planetary gear 13b.

A control system (not shown) controls a driving (rotary) force of a motor 3, and the driving force rotationally drives a gear 41 coupled to a motor rotary shaft 4 and revolves a revolving gear 5 engaged with the gear 41 at a predetermined rotary speed. Being coupled to the revolving gear 5, the rotary arms 31a and 31b also revolve when the revolving gear 5 revolves. Consequently, the first planetary gears 12a and 12b and the second planetary gears 13a and 13b pivotally supported by the rotary arms 31a and 31b revolve in synchronization with the revolving motion of the revolving gear 5.

The braking device 8 applies the braking force to the sun gear 11 through a first brake gear 9 and a second brake gear 10. Accordingly, the rotary frequency of the sun gear 11 is controlled in a range from zero to the revolving frequency of the revolving gear 5 using a braking current or a braking voltage applied to the braking device 8.

With no braking force applied to the sun gear 11, the sun gear 11 revolves at the same speed as that of the revolving gear 5. In this case, the first planetary gears 12a and 12b and the second planetary gears 13a and 13b, which revolve at the same speed as that of the revolving gear 5, keep stationary relative to the sun gear 11. The first planetary gears 12a and 12b and the second planetary gears 13a and 13b do not rotate.

When the braking force is applied to the sun gear 11, the revolving frequency of the sun gear 11 is lowered compared with that of the revolving gear 5, and the first planetary gears 12a and 12b and the second planetary gears 13a and 13b rotate relative to the sun gear 11. As described above, since the first planetary gears 12a and 12b and the second planetary gears 13a and 13b engage with the sun gear 11, all of them rotate in the same direction, thereby generating rotational motions.

The first planetary gears 12a and 12b and the second planetary gears 13a and 13b are mechanically coupled to the sun gear 11 so as to rotate in the same direction by engaging with the sun gear 11. The first planetary gear and the second planetary gear respectively function as a first rotary motion conversion element and a second rotary motion conversion element, each of which converts a revolving motion into a rotational motion.

The braking device 8 can continuously change the braking force applied to the sun gear 11. Accordingly, such a braking device 8 can continuously change a transmission rate, which is for the rotary motion of the motor 3 transmitted to each of the first and second planetary gears, and also can continuously change each rotational speed of the first and second planetary gears optionally.

The rotary speed of the first planetary gears 12a and 12b depend on one gear ratio (first gear ratio) of the sun gear 11 to each of the first planetary gears 12a and 12b, and the rotary speed of the second planetary gears 13a and 13b depend on the other gear ration (second gear ration) of the sun gear 11 to each of the second planetary gears 13a and 13b.

Although the revolving frequencies of the first and second planetary gears relative to the sun gear 11 do not exceed the revolving frequency of the revolving gear 5, the rotational frequency can be changed by change of the first and second gear ratios. The rotational frequency can be changed by α times, for example, double, of the revolving frequency. It means that the rotational frequencies of the first and second planetary gears can be controlled in a range from zero to a times of the revolving frequency. The gear ratios can be changed, and it enhances the degree of freedom for setting the control range of the rotational motions.

In this case, "α" is a value that is determined by the ratio of the number of teeth of two gears and can also be the number other than an integer.

As seen in FIGS. 6A and 6B, both of the first planetary gears 12a and 12b and the second planetary gears 13a and 13b revolve clockwise relative to the sun gear 11 in FIG. 6A and revolve counterclockwise relative to the sun gear 11 in FIG. 6B.

Because the first planetary gears 12a and 12b and the second planetary gears 13a and 13b are revolving in synchronization with the revolving motion of the revolving gear 5, the rotational direction relative to the revolving gear 5 (a static system of the revolving gear 5) is the same as the above.

In one example, it is assumed that the first one-way clutches 14a and 14b transmit only clockwise rotary motions to the first intermediate gears 15a and 15b and that the second one-way clutches 16a and 16b transmit only counterclockwise rotary motions to the second intermediate gears 17a and 17b.

In FIG. 6A, the first one-way clutches 14a and 14b transmit a clockwise rotary motion, whose direction is the same as the revolving direction, from the first planetary gears 12a and 12b to the first intermediate gears 15a and 15b, but the second intermediate gears 17a and 17b remain rotatable.

The first intermediate gears 15a and 15b engage with the rotational gears 18a and 18b and the second intermediate gears 17a and 17b and transmit the rotational motions to the rotational gears 18a and 18b and the second intermediate gears 17a and 17b. Accordingly, the rotational gear 18a and 18b and the second intermediate gears 17a and 17b rotate counterclockwise relative to the sun gear 11.

The rotational gears 18a and 18b rotate counterclockwise relative to a static system of the sun gear 11 and also rotate counterclockwise relative to a static system of the revolving gear 5 (that is, a coordinate system revolving along with the revolving gear 5) accordingly.

Alternatively, in FIG. 6B, the second one-way clutches 16a and 16b transmit a counterclockwise rotary motion, whose direction is the same as the revolving direction, from the second planetary gears 13a and 13b to the second intermediate gears 17a and 17b, but the first intermediate gears 15a and 15b remain rotatable.

The second intermediate gears 17a and 17b engage with the first intermediate gears 15a and 15b and transmit the rotational motions to the first intermediate gears 15a and 15b. Accordingly, the first intermediate gears 15a and 15b rotate clockwise relative to the sun gear 11. Furthermore, the first intermediate gears 15a and 15b engage with the rotational gears 18a and 18b, and thus, the rotational gears 18a and 18b rotate counterclockwise relative to the sun gear 11.

In both case illustrated in FIGS. 6A and 6B, the rotational gears 18a and 18b rotate counterclockwise relative to the static system of the sun gear 11 and also rotate counterclockwise relative to the static system of the revolving gear 5.

However, the rotational gears 18a and 18b do not always rotate counterclockwise relative to a static system of the housing 100.

As described above, the first one-way clutch 14a (14b) and the second one-way clutch 16a (16b) select either the first intermediate gear 15a (15b) or the second intermediate gears 17a (17b) according to the revolving direction of the revolving gear 5, which is determined by the rotary motion of the motor 3 (e.g. clockwise or counterclockwise), and transmit a rotational motion whose direction is the same as the revolving direction to the selected one.

When the first intermediate gears 15a (15b) is selected, the rotary motion is transmitted from the first intermediate gear 15a (15b) to the rotational gear 18a (18b). When the second intermediate gear 17a (17b) is selected, the rotary motion is transmitted from the second intermediate gear 17a (17b) to the rotational gear 18a (18b) through the first intermediate gear 15a (15b).

Consequently, when the rotary direction of the motor 3 is inversed, the rotational directions of the container holders 2a and 2b relative to the revolving motion (the static system of the revolving gear 5) are inversed.

If the first one-way clutches 14a and 14b transmit only the counterclockwise rotary motions to the first intermediate gear 15a and 15b and the second one-way clutches 16a and 16b transmit only the clockwise rotary motions to the second intermediate gears 17a and 17b, the corresponding processing as described above will follow. Thus, the description is omitted.

The transmission means between the sun gear 11 and the second planetary gears (or mechanical coupling means) is not limited to the gears. For example, a combination of pulleys and a belt may also be adopted.

With the gears as above, the frequency of the rotational motion can be easily changed by appropriately determining the gear ratio. The gear ratio can be changed by changing the teeth numbers, and thus, the increased frequency of the rotary motion does not lead to an increased size of the apparatus.

For the above combination of pulleys and a belt, it is difficult to couple one pulley to a plurality of pulleys with the belt. The above means that two pulleys and one belt are required per one combination of one sun gear and one planetary gear. In this case, two combinations of two pulleys and one belt are required for one container holder. Furthermore, each of two container requires the two combinations, and a total of four above combinations are necessary.

Such four combinations cannot be arranged on one plane and requires to be arranged three-dimensionally, thus leading to an increased size of the agitation/defoaming apparatus.

Additionally, the more increased number of the pulleys need the higher output drive motor for supporting the total weight.

One sun gear and two planetary gears engaged with the sun gear are prepared per one container holder, and the two planetary gears are arranged around the sun gear on one plane. Compared with the configuration for the pulleys, such an arrangement allows the agitation/defoaming apparatus to be downsized and power-saved to achieve high precision of the rotary motion control.

Additionally, one sun gear and two planetary gears around the sun gear are arranged per one container holder, and the gravity center among the containers and the revolving shaft 19 are arranged on an identical axis. This configuration can easily increase the number of the container holders (e.g. more than three).

The agitation/defoaming apparatus 1 can be a compact device that processes only one container holder by arranging a balance weight at a position facing to the one container holder. In this configuration, the gravity center among the container holder and the balance weight and the revolving shaft 19 are also arranged on an identical axis.

A plurality of combinations of the container holder and the balance weight may also be arranged.

Effect of Agitation/Defoaming Apparatus

The agitation/defoaming apparatus 1 can change the rotational motions of the container holders 2a and 2b relative to the revolving motion by controlling the motor 3 for rotational driving and by reversing the revolving direction of the container holders 2a and 2b (the revolving direction of the revolving gear 5).

In one example, the agitation/defoaming apparatus 1 can easily perform an agitation/defoaming process where two process are continuously combined as follows.

First, the motor 3 and the braking device 8 are controlled, and it transmits a revolving motion, which includes a predetermined revolving frequency in a predetermined revolving direction (clockwise or counterclockwise), to the revolving gear 5 and applies a predetermined braking force to the sun gear 11. Such a configuration enables the container holders 2a and 2b to revolve relative to the sun gear 11 and to rotate at a predetermined rotational frequency in a direction opposite to the above revolving direction of the revolving gear 5 (counterclockwise or clockwise).

Subsequently, the motor 3 revolves the revolving gear 5 at the same frequency as the above predetermined revolving frequency but in a direction opposite to the above predetermined revolving direction (counterclockwise or clockwise), and the braking device 8 applies the predetermined braking force to the sun gear 11. Such a configuration enables the container holders 2a and 2b to revolve in the above opposite direction (counterclockwise or clockwise) to relative to the sun gear 11 and to rotate at a predetermined rotational frequency in the same direction as the above revolving direction of the revolving gear 5 (counterclockwise or clockwise).

While revolving an object (static system of the revolving gear 5), the agitation/defoaming apparatus 1 rotates the object in one rotational direction opposite to the revolving direction with the constant rotational frequency and then rotates the object in the other rotational direction same as the revolving direction with the still constant rotational frequency. Consequently, the above different rotational motions having each individual rotational direction were superposed on the revolving motion. The agitation/defoaming apparatus 1 can advantageously combine the above processes and perform the combined process. It was confirmed that an advantageous process condition for both the agitation and defoaming processes was easily achieved using the agitation/defoaming apparatus 1.

The conventional agitation/defoaming apparatus has used a first drive motor for a revolution and a second drive motor for a rotation independently from each other to determine an advantageous process condition capable of both agitation/defoaming. Relative to the frequency of the revolving motion set constant, one rotational frequency in the same direction as that of the revolving motion and the other rotational frequency in a direction opposite to that of the revolving motion need to be set independently from each other to determine the optimum process condition.

The first drive motor for the revolution and the second drive motor for the rotation in such a conventional apparatus are secured in a housing, and the revolving and rotational motions are defined in a static system of the housing of the apparatus. Accordingly, the first drive motor generates a revolving motion and the second drive motor generates a rotational motion completely independently from each other.

It was found that the object to be agitated/defoamed tends to be effectively agitated in a revolving direction and one rotational direction opposite to the revolving direction and to be effectively defoamed in the revolving direction and the other rotational direction same as the revolving direction.

While revolving an object (static system of the revolving gear 5), the agitation/defoaming apparatus 1 rotates the object in one rotational direction opposite to the revolving direction with the constant rotational frequency and then rotates the object in the other rotational direction same as the revolving direction with the still constant rotational frequency. On the basis of the above knowledge, it was confirmed that combining such processing conditions can reduce the number of the conditions for rotation that should be verified and further can greatly reduce labor, time, and samples for tests for determining the processing conditions for the object.

Such an advantageous effect of the agitation/defoaming apparatus 1 can greatly reduce the cost for determining an agitation/defoaming condition corresponding to a variety of objects as described below.

In one example, consider the experiment to optimize the process condition of the rotational motion at a fixed revolving frequency condition. In the case of the conventional agitation/defoaming apparatus, it is necessary to investigate the agitation/defoaming efficiency for the combined conditions, for example, of 10 rotational conditions where the rotation direction is the as the revolving direction and of 10 rotational conditions where the rotation direction is opposite to the revolving direction, that is, totally 100 conditions.

On the other hand, the agitation/defoaming apparatus 1 can agitate and defoam an object using a special processing condition. Under such a special processing condition, each rotational motion may be in either direction that is opposite to or the same as the revolving motion, but the rotational frequency can be kept constant. Consequently, verifying 10 processing conditions can determine the optimum processing condition, completing the determination with one-tenth of the labor and the one-tenth of the number of the samples.

First Variation

The agitation/defoaming apparatus 1 can agitate/defoam a variety of objects to be processed, but the optimum revolving and rotational processing condition for the container holder may vary depending physical property or the like of the object. The optimum condition may also vary depending on not only the physical property of the object but also the processing purpose, the customer's request, or the like.

The agitation/defoaming apparatus 1 can respectively set different values, not one value, to the first gear ratio and the second gear ratio for the revolving and rotational processing conditions to correspond to the physical property of the object, the customer's request, or the processing purpose. The agitation/defoaming apparatus 1 can be customized to advantageously correspond to a processing condition with the high use frequency, thus enhancing processing efficiency and productivity.

The higher gear ratio allows the braking device 8 to enlarge the control range. In one example, while a normal gear ratio allows the rotational frequency to be controlled in a range from 0 to 1 times the revolving frequency, the double gear ratio allows the rotational frequency to be controlled in a range from 0 to 2 times the revolving frequency without replacing the braking device 8 with the other larger one.

The larger braking device is unnecessary to increase the braking force, and changing the gear ratio allows the device to be customized. Such a configuration eliminates the arrangement change of each component, such as the motor 3, or replacing of the housing, which is needed for the larger braking device 8, enabling the customization without greatly changing the arrangement of each component.

On the other hand, the lower gear ratio reduces a change in the rotational frequency relative to the braking force of the braking device 8, enabling a fine control of the braking force (miniaturizing the resolution of control of the braking force) without replacing the braking device 8.

In this way, the agitation/defoaming apparatus 1 can control the rotational speed not only using the rotary driving force of the motor 3 and the braking force of the braking device 8 but also using the sun gear 11, the rotational gears 18a and 18b, the first intermediate gears 15a and 15b, the second intermediate gears 17a and 17b, the first planetary gears 12a and 12b, and the second planetary gears 13a and 13b. In the other words, the agitation/defoaming apparatus 1 is configured to enable a variety of control.

FIG. 7 shows variations including usable combinations of various gears to control the rotational motion. FIG. 7 indicates an example where the first one-way clutch 12a (12b) transmits only a clockwise motion and the second one-way clutch 13a (13b) transmits only a counterclockwise motion. However, the usable combinations are not limited to the above example.

Each gear configuration in a right position of each row of the table in FIG. 7 corresponds the configuration of each gear in FIG. 5, and the reference signs are omitted due to space circumstances. These gear configurations are schematically illustrated for the understanding, and each relative relationship of the gear diameters is not illustrated correctly.

In still FIG. 7, each of "first intermediate gear=second intermediate gear", "first intermediate gear<second intermediate gear", "first planetary gear=second planetary gear", "first planetary gear<second planetary gear", and the like shows a large/small relation of the number of teeth of each gear. For example, "first intermediate gear=second intermediate gear" means that the number of teeth of the first intermediate gear is equal to that of the second intermediate gear and "first intermediate gear<second intermediate gear" means that the number of teeth of the second intermediate gear is larger that that of the first intermediate gear.

In still FIG. 7, in particular, "the number of teeth of the first intermediate gear" indicates the number of teeth of first transmission gear 151a (151b), "the number of teeth of the second intermediate gear" indicates the number of teeth of the second intermediate gear 17a (17b), "the number of teeth of the first planetary gear" indicates the number of teeth of the first planetary gear 12a (12b), and "the number of teeth of the second planetary gear" indicates the number of teeth of the second planetary gear 13a (13b).

In still FIG. 7, "L" denotes a linear distance between the center of the revolving shaft to the container holder (e.g. the bottom of the rotational shaft of the container holder), and L(X) means the distance L on condition X.

In still FIG. 7, "clockwise" and "counterclockwise" denote directions of the revolving motion. Each of "revolution=rotation", "revolution<rotation", and "revolution>rotation" shows a large/small relation between the revolving frequency and the rotational frequency and respectively means that the revolving frequency is equal to the rotational frequency, that the revolving frequency is smaller than the rotational frequency, and that the revolving frequency is larger than the rotational frequency. In this case, the rotational frequency is a rotary frequency relative to the static system of the revolving gear 5, and the revolving frequency is a rotary frequency relative to the static system of the housing 100.

For the understanding, only the principle components that may be changed depending on conditions are shown, but the gear configurations are not limited to them in FIG. 7.

Each condition in FIG. 7 will be described below.

In the condition A, the number of teeth of the first intermediate gear is equal to that of the second intermediate gear, the number of teeth of the first planetary gear is equal to that of the second planetary gear, and the (highest) rotational frequency and the revolving frequency are set to be the same in either revolving directions, that is, both clockwise and counterclockwise directions.

The other conditions are examples where the gear configurations are changed relative to the condition A.

In the condition B, the number of teeth of the first intermediate gear is equal to that of the second intermediate gear, and the number of teeth of the second planetary gear is larger than that of the first planetary gear.

Under the condition B, the revolving frequency is equal to the (highest) rotational frequency in a clockwise revolving direction, but the (highest) rotational frequency is smaller than the revolving frequency in a counterclockwise revolving direction. In this case, a distance between the revolving shaft and the container holder is equal to the distance in the condition A.

In the condition C, the number of teeth of the first intermediate gear is equal to that of the second intermediate gear, and the number of teeth of the second planetary gear is smaller than that of the first planetary gear.

Under the condition C, the (highest) rotational frequency is smaller than the revolving frequency in clockwise revolving direction, but the revolving frequency is equal to the (highest) rotational frequency in counterclockwise revolving direction. In this case, a distance between the revolving shaft and the container holder is longer than the distance in the condition A.

In the condition D, the number of teeth of the second intermediate gear is larger than that of the first intermediate gear, and the number of teeth of the first planetary gear is equal to that of the second planetary gear.

Under the condition D, the revolving frequency is equal to the (highest) rotational frequency in clockwise revolving direction, but the revolving frequency is smaller than the (highest) rotational frequency in counterclockwise revolving direction. In this case, a distance between the revolving shaft and the container holder is equal to the distance in the condition A.

In the condition E, the number of teeth of the second intermediate gear is smaller than that of the first intermediate gear, and the number of teeth of the first planetary gear is equal to that of the second planetary gear.

Under the condition E, the revolving frequency is equal to the (highest) rotational frequency in clockwise revolving direction, but the revolving frequency is larger than the (highest) rotational frequency in counterclockwise revolving direction. In this case, a distance between the revolving shaft and the container holder is equal to the distance in the condition A.

In the condition F, the number of teeth of the second intermediate gear is larger than that of the first intermediate gear, and the number of teeth of the second planetary gear is also larger than that of the first planetary gear.

Under the condition F, the revolving frequency is equal to the (highest) rotational frequency in clockwise revolving direction, and the revolving frequency is also equal to the (highest) rotational frequency in counterclockwise revolving direction. In this case, a distance between the revolving shaft and the container holder is equal to the distance in the condition A.

In the condition G, the number of teeth of the second intermediate gear is smaller than that of the first intermediate gear, and the number of teeth of the second planetary gear is also smaller than that of the first planetary gear.

Under the condition G, the (highest) rotational frequency is smaller than the revolving frequency in clockwise revolving direction, and the (highest) rotational frequency is also smaller than the revolving frequency in counterclockwise revolving direction. In this case, a distance between the revolving shaft and the container holder is longer than the distance in the condition A.

In this way, a variety of combinations of rotations and revolutions can be achieved by changing the configuration of each gear.

The container holder is revolving in synchronization with the revolving gear 5, and thus, the revolving motion of the container holder means a revolving motion in the static system of the housing 100.

Other than the examples in FIG. 7, for example, the revolving frequency can be smaller than the rotational frequency in a clockwise revolution, and the revolving frequency can also be made larger than the rotational frequency in a counterclockwise revolution.

Each gear can be appropriately replaced according to the agitation/defoaming condition to be processed.

The effect with high priority for the agitation/defoaming process is considered depending on properties, such as viscosity and gravity, of the object, and the most suitable gear ratio for the process is adopted, thereby enhancing processing capabilities of the agitation/defoaming apparatus 1.

When, for example, the revolving direction of the container is opposite to its rotational direction in the static system of the revolving gear 5, it is possible to enhance the agitation effect by adopting a gear ratio condition which makes the rotational frequency in the static system of the revolving gear 5 larger than the revolving frequency of the container holder.

Second Variation

As described above, each of the first planetary gear 12a (12b) and the second planetary gear 13a (13b) engage with the sun gear 11 at the engagement part 121a (121b) and the engagement part 131a (131b) respectively (see FIG. 5).

As shown in FIG. 5, the first planetary gear 12a (12b) is T-shaped, and the second planetary gear 13a (13b) is inverted T-shaped. They are arranged in directions vertically opposite to each other, thereby saving the space.

Figure 8A:
FIG. 8A is a cross-sectional view of the agitation/defoaming apparatus according to another variation of the present invention, illustrating a configuration of the sun gear.

As shown in FIG. 8A, the sun gear 11 is configured with single gear having enough thickness t (height) to engage with the first planetary gear 12a (12b) and the second planetary gear 13a (13b) at the engagement part 121a (121b) and the engagement part 131a (131b), but is not limited to this configuration.

Figure 8B:
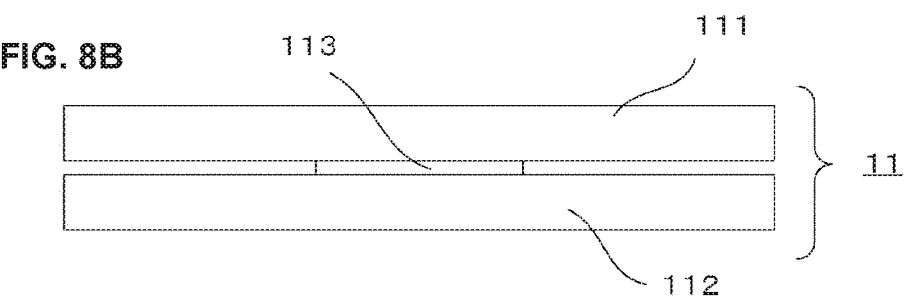
FIG. 8B is a cross-sectional view of the agitation/defoaming apparatus according to still another variation of the present invention, illustrating a configuration of the sun gears.

As shown in FIG. 8B, the sun gear 11 can be configured by two gears, that is, a first sun gear 111 and a second sun gear 112 so as to engage with the first planetary gear 12a (12b) and the second planetary gear 13a (13b) respectively at the engagement part 121a (121b) and the engagement part 131a (131b) and the first sun gear 111 and the second sun gear 112 can be coupled at a coupling part 113.

Figure 8C:
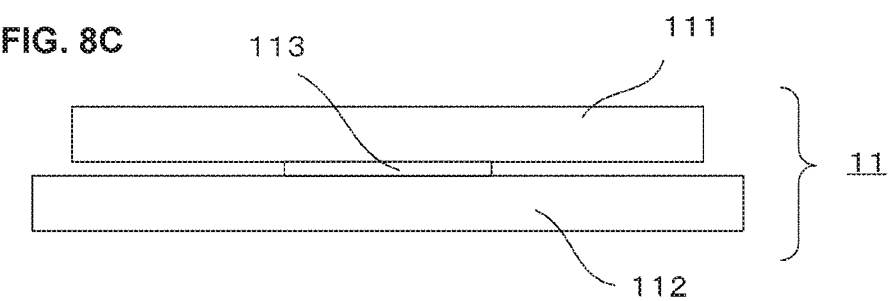
FIG. 8C is a cross-sectional view of the agitation/defoaming apparatus according to still another variation of the present invention, illustrating a configuration of the sun gears.

As shown in FIG. 8C, the first sun gear 111 and the second sun gear 112, which constitute the sun gear 11, may have different diameters each other. The first sun gear 111 and the second sun gear 112 can be coupled at the coupling part 113.

Figure 8D:
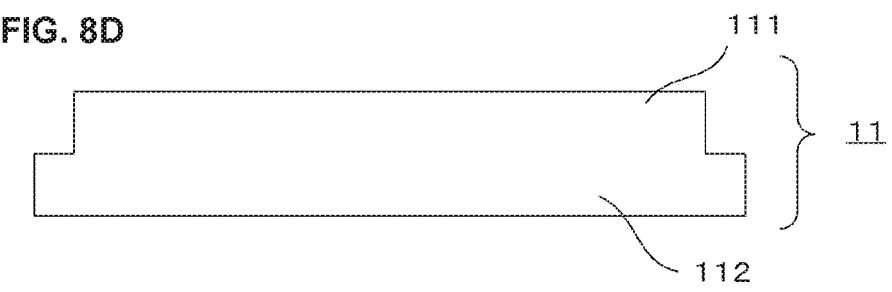
FIG. 8D is a cross-sectional view of the agitation/defoaming apparatus according to still another variation of the present invention, illustrating a configuration of the sun gears.

As shown in FIG. 8D, the first sun gear 111 and the second sun gear 112 having different diameters may be integrated.

FIGS. 8C and 8C illustrate each example where the diameter of the first sun gear 111 is shorter than that of the second sun gear 112. However, the diameters are not limited to the above example and the diameters of the first sun gear 111 may be longer than that of the second sun gear 112.

Such a configuration including the first sun gear 111 and the second sun gear 112 can adjust the gear ratio of the first planetary gear 12a (12b) to the second planetary gear 13a (13b) by changing the number of teeth of each of the first sun gear 111 and the second sun gear 112, thereby enhancing the degree of freedom for setting the gear ratios.

Additionally, the first sun gear 111 and the second sun gear 112 can appropriately be selected according to the diameters of the first planetary gear 12a (12b) and the second planetary gear 13a (13b), and it enables not only changing the gear ratios but also saving the space.

Third Variation

When the rotational gear 18a (18b) (container holder 2a (2b)) is engaged with the first intermediate gear 15a (15b) and each gear is arranged as shown in FIG. 4B, additional container holder(s) can be easily arranged relative to the second intermediate gear 17a (17b).

Figure 9:
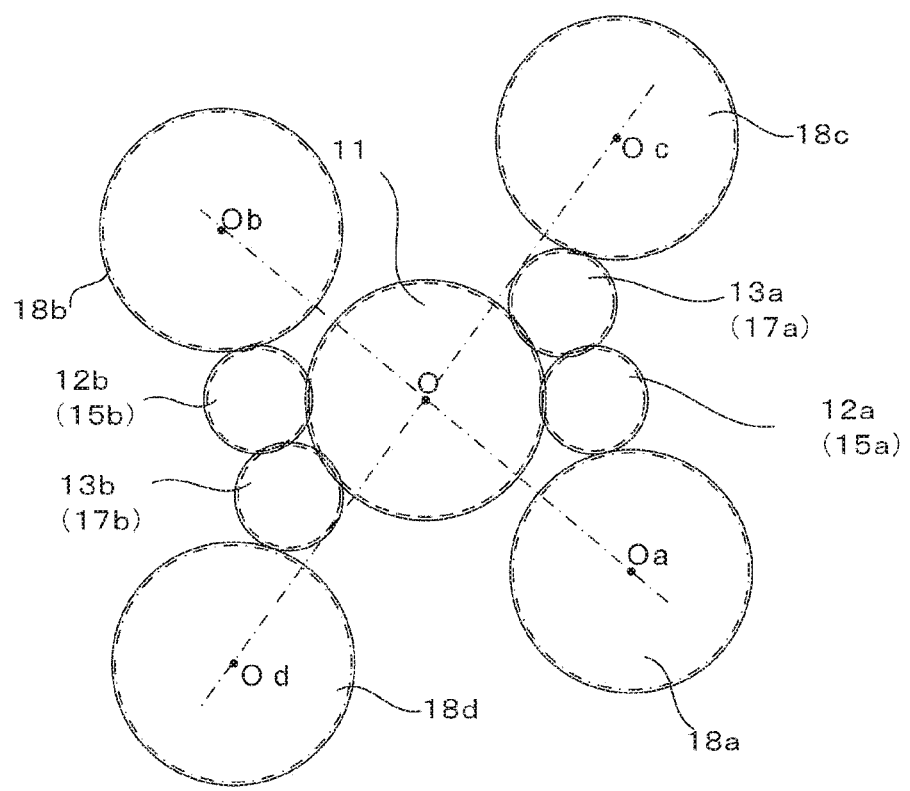
FIG. 9 is a top view of the agitation/defoaming apparatus according to still another variation of the present invention, illustrating an arrangement of the main gears.

As shown in FIG. 9, a container holder 2c (not shown) having a rotational gear 18c and a container holder 2d (not shown) having a rotational gear 18d are added. The rotational gears 18c and 18d are arranged to respectively engage with the second intermediate gears 17a and 17b, and the center Oc of the rotational gear 18c, the center O of the sun gear 11, and the center Od of the rotational gear 18d are aligned.

The container holders 2c and 2d are respectively configured to be the same as the container holders 2a and 2b, and the rotational gears 18c and 18d are respectively configured to be the same as the rotational gears 18a and 18b.

As described above, when the rotational motion is selectively transmitted to the first intermediate gear 15a (15b), the first intermediate gear 15a (15b) transmits the rotational motion to both of the rotational gear 18a (18b) and the second intermediate gear 17a (17b).

Since the rotational gear 18c (18d) engages with the second intermediate gear 17a (17b), the rotational motion transmitted to the second intermediate gear 17a (17b) is transmitted to the rotational gear 18c (18d).

In this way, the rotational motions are transmitted to the container holders 2a, 2b, 2c, and 2d.

When the rotational motion is selectively transmitted to the second intermediate gear 17a (17b), and the intermediate gear 17a (17b) transmits the rotational motion to both of the rotational gear 18c (18d) and the first intermediate gear 15a (15b). The rotational motion transmitted to the first intermediate gear 15a (15b) is then transmitted to the rotational gear 18a (18b). In this way, the rotational motions are transmitted to the container holders 2a, 2b, 2c, and 2d.

In an example shown in FIG. 9, the rotational gears 18a and 18b rotate in a first direction, but the rotational gears 18c and 18d rotate in a second direction that is opposite to the first direction.

Two third intermediate gears may be prepared as necessary. Each third intermediate gears may be respectively pivotally placed between the rotational gear 18c and the second intermediate gear 17a and between the rotational gear 18d and the second intermediate gear 17b so as to invert the rotary motions of the rotational gears 18c and 18d. The use of the third gears allows the rotational gears 18a and 18b and the rotational gears 18c and 18d to rotate in the same direction.

In this way, the agitation/defoaming apparatus 1 enable each gear to transmit its rotational motion each other irrespective of the rotational directions of the first intermediate gears 15a and 15b and the second intermediate gears 17a and 17b. Accordingly, the container holders can be added as shown in FIG. 9, easily achieving an agitation/defoaming apparatus having a high processing capability.

In the variation, the agitation/defoaming apparatus 1 including four container holders 2a, 2b, 2c, and 2d are described.

The configuration in FIG. 9 including only the rotational gears 18a and 18b corresponding to the container holders 2a and 2b is the same configuration as those in FIGS. 4A and 4B, and it can be one agitation/defoaming apparatus 1 including two container holders (container holders 2a and 2b). The configuration in FIG. 9 including only the rotational gears 18c and 18d corresponding to the container holders 2c and 2d also leads to the other agitation/defoaming apparatus 1 including two container holders (container holders 2c and 2d).

The first intermediate gears 15a and 15b and the second intermediate gears 17a and 17b are used to transmit rotational motions to each other, thereby leading to an agitation/defoaming apparatus having a variety of configurations.

The agitation/defoaming apparatus according to the present invention has been described using embodiments. However, the technical concept for the present invention is a unit configuration that adds a selective transmission function for rotary directions to each unit having a gear configuration for converting a revolving motion into a rotational motion and transmitting the rotational motion. The selective transmission function makes the rotational motion, whose direction is selectively transmitted according to the revolving direction, be transmitted to the object together with the revolving motion, and the revolving and rotational motions are made to relay a control by a braking force other than the output control by the motor of the driving source in their transmittal paths.

The one-direction clutch in the above configures to have the selective transmission function for rotary directions relative to an optional rotary direction but the other configuration may achieve the function. For example, a bearing structure for pivotally supporting the one-direction clutch is, but not limited to, preferred.

Each one-way clutch can be configured with a clutch and a bearing separately.

The agitation/defoaming apparatus according to the present invention allows structures for transmitting rotary motions to be arranged near the revolving shaft center, that is, to be concentrated near the center of the rotary motion, leading to a well-balanced system in weight for controlling the rotary motion.

The present invention includes a rotary motion transmission device, and the transmission paths for the rotary motions are configured by gears. However, the present invention is not limited to the above mentioned configuration with the gears of the shape, size, arrangement position, and the teeth number, the single gear with different teeth number gear portions, the stacking structure with different teeth number gears, or the combination of these configurations. It is only required that a configuration can accurately transmit the rotary powers and can control the rotary directions (orientation).

If the other configuration is adopted instead of the gears, it is only required that the configuration can receive a rotary power having a rotary direction on one side and then can transmit the rotary power having the reversed rotary direction from the other side.

For the paths for transmitting the braking force, it is only required that a path can transmit the braking force between the braking device and the sun gear, and the path is not limited to a particular path in the above examples.

INDUSTRIAL APPLICABILITY

Embodiments of the present invention can provide an advantageous agitation/defoaming apparatus capable of controlling a revolution and a rotation independently from each other. The apparatus configuration can also be easily changed according to a variety of purposes, thus leading to a great industrial applicability.

REFERENCE SIGNS LIST

1: agitation/defoaming apparatus
2a, 2b, 2c, 2d: container holder
3: motor
4: motor rotary shaft
5: revolving gear
5: cover member
7: opening
8: powder brake
9: first brake gear
10: second brake gear
11: sun gear
12a, 12b: first planetary gear
13a, 13b: second planetary gear
14a, 14b: first one-way clutch
15a, 15b: first intermediate gear
16a, 16b: second one-way clutch
17a, 17b: second intermediate gear
18a, 18b, 18c, 18d: rotational gear
19: revolving shaft
20a, 20b: rotational shaft 21a: 21b: first engagement part
22a, 22b: second engagement part
30: rotary drum
31: rotary arm
41: gear
50: base plate
51: vibration control device
52a, 52b: side plate
100: housing
111: first sun gear
112: second sun gear
113: coupling part
121a, 121b: engagement part
131a, 131b: engagement part
151a, 151b: first transmission gear
152a, 152b: second transmission gear
200a, 200b: container
201a, 202b: support body

The invention claimed is:

1. An agitation/defoaming apparatus comprising:
a motor capable of changing a rotary direction;
a brake;
a first rotor that is rotated around a revolving shaft by a rotary power of the motor;
a second rotor where a braking force of the brake is applied, while the rotary power of the motor makes the second rotor rotate around a revolving shaft;
a container holder pivotally supported by the first rotor; and
a rotary motion transmitter revolving along with the first rotor,
wherein the rotary motion transmitter comprises a third rotor, a fourth rotor, a first rotary motion converter, and a second rotary motion converter,
wherein the third rotor and the fourth rotor are mechanically coupled to each other, and the first rotary motion converter and the second rotary motion converter are mechanically coupled to the second rotor,
wherein a rotational motion in a predetermined direction generated by the first rotary motion converter is transmitted to the third rotor and another rotational motion in a direction opposite to the predetermined direction generated by the second rotary motion converter is transmitted to the fourth rotor,
wherein the third rotor is mechanically coupled to the container holder,
wherein a revolving motion is transmitted to the container holder, and
wherein the rotary motion transmitter converts a revolving motion of the rotary motion transmitter relative to the second rotor into a rotational motion in a predetermined direction relative to the rotary motion of the first rotor, and transmits the rotational motion to the container holder.

2. The agitation/defoaming apparatus according to claim 1, further comprising:
a first selective rotary motion transmitter allowing only a first rotary motion in a predetermined direction to be transmitted, and
a second selective rotary motion transmitter allowing only a second rotary motion, whose direction is opposite to the first rotary motion, to be transmitted,
wherein the first rotary motion converter is coupled to the third rotor through the first selective rotary motion transmitter, and the second rotary motion converter is coupled to the fourth rotor through the second selective rotary motion transmitter.

3. The agitation/defoaming apparatus according to claim 2,
wherein each of the third rotor, the fourth rotor, the first rotary motion converter, and the second rotary motion converter is composed of a gear, and
wherein each of the first selective rotary motion transmitter and the second selective rotary motion transmitter is a one-way rotary motion transmitter.

4. The agitation/defoaming apparatus according to claim 1, wherein the second rotor is composed of a gear, and the container holder is connected to a rotational gear.

5. The agitation/defoaming apparatus according to claim 1,
wherein the first rotary motion converter converts a revolving motion of the rotary motion transmitter relative to the second rotor into a first rotational motion and the second rotary motion converter converts a revolving motion of the rotary motion transmitter relative to the second rotor into a second rotational motion, and
wherein the first rotational motion or the second rotational motion is transmitted to the container holder and frequencies of the first rotational motion and the second rotational motion are different from each other.

6. A method for agitating/defoaming an object by revolving and rotating a container containing the object to be processed, comprising:
rotating a first rotor using a rotary motion applied from a motor;
rotating a second rotor to follow the first rotor, wherein a braking force is applied to the second rotor and the braking force controls a rotational frequency of the second rotor to be equal to or less than a rotational frequency of the first rotor;
revolving a first rotary motion converter and a second rotary motion converter along with the first rotor, the revolving making the first rotary motion converter and the second rotary motion converter be revolved relative to the second rotor; and generating a rotational motion from the revolving motion relative to the second rotor through the first rotary motion converter and the second rotary motion converter,
wherein, if revolving directions of the first and second rotary motion converters are in a predetermined direction relative to the second rotor, a first selective rotary motion transmitter transmits a first revolving motion and a first rotational motion of the first rotary motion converter to a third rotor,
while rotatably supporting a fourth rotor, a second selective rotary motion transmitter transmits a second revolving motion of the second rotary motion converter to the fourth rotor, and
the first rotational motion is transmitted from the third rotor to the fourth rotor,
wherein, if the revolving directions of the first and second rotary motion converter are in a direction opposite to the predetermined direction relative to the second rotor, the second selective rotary motion transmitter transmits the second revolving motion and a second rotational motion of the second rotary motion converter to the fourth rotor,
while rotatably supporting the third rotor, the first selective rotary motion transmitter transmits the first revolving motion of the first selective rotary motion transmitter to the third rotor, and
the second rotational motion is transmitted from the fourth rotor transmits to the third rotor, and
wherein at least one of the third and fourth rotors transmits the revolving and rotational motions to the container containing the object, thereby agitating and defoaming the object.

7. A rotary motion transmission device suitable for a revolving and rotational motion imparting apparatus having: a motor capable of changing a rotary direction; a revolving shaft; a first rotor and a second rotor rotate around the revolving shaft, a brake applying a braking force to the second rotor; and a container holder that is pivotally supported by the first rotor and that applies a rotary motion to a container containing an object to be processed, wherein the rotary motion transmission device converts a relative motion of the first rotor relative to the second rotor into a rotational motion and transmits the rotational motion to the container holder, the rotary motion transmission device comprising:
a third rotor and a fourth rotor;
a first rotary motion converter and a second rotary motion converter;
a first selective rotary motion transmitter allowing only a first rotary motion in a predetermined direction to be transmitted; and
a second selective rotary motion transmitter allowing only a second rotary motion in a direction opposite to the first rotary motion in the predetermined direction, which is allowed by the first selective rotary motion transmitter, to be transmitted,
wherein the third rotor and the fourth rotor are mechanically coupled each other, and
wherein the first rotary motion converter is coupled to the third rotor through the first selective rotary motion transmitter and, the second rotary motion converter is coupled to the fourth rotor through the second selective rotary motion transmitter.

8. The rotary motion transmission device according to claim 7,
wherein the first and second rotary motion converters are pivotally supported by the first rotor and are mechanically coupled to the second rotor, and
wherein the third rotor is mechanically coupled to the container holder.

9. The rotary motion transmission device according to claim 8, wherein each of the first selective rotary motion transmitter and the second selective rotary motion transmitter is a one-way rotary motion transmitter.

10. The rotary motion transmission device according to claim 9, wherein the one-way rotary motion transmitter is a one-way clutch.

11. The rotary motion transmission device according to claim 8, wherein each of the third rotor, the fourth rotor, the first rotary motion converter, and the second motion converter is composed of a gear.

12. The rotary motion transmission device according to claim 8, wherein a first rotational frequency transmitted to the third rotor is different from a second rotational frequency transmitted to the fourth rotor.

13. The rotary motion transmission device according to claim 8, wherein each of the third rotor, the fourth rotor, the first rotary motion converter, and the second motion converter are composed of a gear, and
wherein at least one ratio selected from the group consisting of
a ratio of a number of teeth of the third rotor to a number of teeth of the fourth rotor and
a ratio of a number of teeth of the first rotary motion converter to a number of teeth of the second motion converter is not even.

14. The rotary motion transmission device according to claim 7, wherein each of the first selective rotary motion transmitter and the second selective rotary motion transmitter is a one-way rotary motion transmitter.

15. The rotary motion transmission device according to claim 14, wherein the one-way rotary motion transmitter is a one-way clutch.

16. The rotary motion transmission device according to claim 14, wherein a first rotational frequency transmitted to the third rotor is different from a second rotational frequency transmitted to the fourth rotor.

17. The rotary motion transmission device according to claim 16, wherein each of the third rotor, the fourth rotor, the first rotary motion converter, and the second motion converter are composed of a gear, and
 wherein at least one ratio selected from the group consisting of
  a ratio of a number of teeth of the third rotor to a number of teeth of the fourth rotor and
  a ratio of a number of teeth of the first rotary motion converter to a number of teeth of the second motion converter is not even.

18. The rotary motion transmission device according to claim 7, wherein each of the third rotor, the fourth rotor, the first rotary motion converter, and the second motion converter is composed of a gear.

19. The rotary motion transmission device according to claim 7, wherein a first rotational frequency transmitted to the third rotor is different from a second rotational frequency transmitted to the fourth rotor.

20. The rotary motion transmission device according to claim 7, wherein each of the third rotor, the fourth rotor, the first rotary motion converter, and the second motion converter are composed of a gear, and
 wherein at least one ratio selected from the group consisting of
  a ratio of a number of teeth of the third rotor to a number of teeth of the fourth rotor and
  a ratio of a number of teeth of the first rotary motion converter to a number of teeth of the second motion converter is not even.

\* \* \* \* \*